US009459488B2

(12) United States Patent
Kuriyama et al.

(10) Patent No.: US 9,459,488 B2
(45) Date of Patent: *Oct. 4, 2016

(54) LIQUID CRYSTAL DISPLAY DEVICE

(71) Applicant: DIC Corporation, Tokyo (JP)

(72) Inventors: Takeshi Kuriyama, Kitaadachi-gun (JP); Jouji Kawamura, Kitaadachi-gun (JP); Akira Kimura, Kamisu (JP); Seiji Funakura, Kamisu (JP); Katsunori Shimada, Sakura (JP)

(73) Assignee: DIC CORPORATION, Tokyo (JP)

( * ) Notice: Subject to any disclaimer, the term of this patent is extended or adjusted under 35 U.S.C. 154(b) by 45 days.

This patent is subject to a terminal disclaimer.

(21) Appl. No.: 14/350,501

(22) PCT Filed: Feb. 21, 2013

(86) PCT No.: PCT/JP2013/054351
§ 371 (c)(1),
(2) Date: Apr. 8, 2014

(87) PCT Pub. No.: WO2014/128885
PCT Pub. Date: Aug. 28, 2014

(65) Prior Publication Data
US 2015/0355499 A1 Dec. 10, 2015

(51) Int. Cl.
| G02F 1/1333 | (2006.01) |
| G02F 1/1335 | (2006.01) |
| C09K 19/20 | (2006.01) |
| C09K 19/54 | (2006.01) |
| C09K 19/44 | (2006.01) |
| C09K 19/04 | (2006.01) |
| C09K 19/12 | (2006.01) |
| C09K 19/30 | (2006.01) |
| C09K 19/34 | (2006.01) |

(52) U.S. Cl.
CPC ......... *G02F 1/133514* (2013.01); *C09K 19/20* (2013.01); *C09K 19/3066* (2013.01); *C09K 19/44* (2013.01); *C09K 19/54* (2013.01); *G02F 1/133512* (2013.01); *C09K 2019/0448* (2013.01); *C09K 2019/0466* (2013.01); *C09K 2019/122* (2013.01); *C09K 2019/123* (2013.01); *C09K 2019/301* (2013.01); *C09K 2019/3004* (2013.01); *C09K 2019/3016* (2013.01); *C09K 2019/3422* (2013.01); *G02F 2001/133397* (2013.01); *G02F 2202/04* (2013.01)

(58) Field of Classification Search
CPC ........... G02F 1/1333; G02F 1/133514; G02F 1/133512; G02F 2202/04; G02F 2001/133397; C09K 19/20; C09K 19/54; C09K 19/44; C09K 19/3066; C09K 2019/0448; C09K 2019/0466; C09K 2019/122; C09K 2019/123; C09K 2019/3004; C09K 2019/301; C09K 2019/3016; C09K 2019/3422

USPC ............. 428/1.1; 252/299.01, 299.6, 299.63, 252/299.66; 349/182, 183
See application file for complete search history.

(56) References Cited

U.S. PATENT DOCUMENTS

| 8,178,173 | B1 | 5/2012 | Matsumoto et al. |
| 8,860,912 | B2 | 10/2014 | Kaneoya et al. |
| 8,885,124 | B2 | 11/2014 | Kaneoya et al. |
| 9,120,968 | B2 | 9/2015 | Kaneoya et al. |
| 2006/0257763 | A1 | 11/2006 | Araki |
| 2010/0097562 | A1 | 4/2010 | Park et al. |
| 2010/0271569 | A1 | 10/2010 | Ohkuma et al. |
| 2011/0058138 | A1 | 3/2011 | Huh et al. |
| 2011/0297881 | A1 | 12/2011 | Hirata et al. |
| 2015/0232757 | A1 | 8/2015 | Kaneoya et al. |
| 2015/0232758 | A1* | 8/2015 | Kuriyama .......... C09K 19/3001 349/86 |

FOREIGN PATENT DOCUMENTS

| CN | 1784481 A | 6/2006 |
| CN | 101817992 A | 9/2010 |
| JP | 2000-019321 A | 1/2000 |
| JP | 2000-19321 A | 1/2000 |
| JP | 2000-192040 A | 7/2000 |
| JP | 2006-317602 A | 11/2006 |
| JP | 2007-133131 A | 5/2007 |
| JP | 2008-144105 A | 6/2008 |
| JP | 2009-007432 A | 1/2009 |
| JP | 2009-58546 A | 3/2009 |

(Continued)

OTHER PUBLICATIONS

International Search Report, dated May 7, 2013, issued in corresponding appllication No. PCT/JP2013/054351.

(Continued)

*Primary Examiner* — Geraldina Visconti
(74) *Attorney, Agent, or Firm* — Westerman, Hattori, Daniels & Adrian, LLP

(57) ABSTRACT

The present invention provides a liquid crystal display device in which a decrease in the voltage holding ratio (VHR) of a liquid crystal layer and an increase in the ion density (ID) are prevented and problems of display defects such as white streaks, alignment unevenness, and image sticking are overcome. The liquid crystal display device of the present invention in which a decrease in the voltage holding ratio (VHR) of a liquid crystal layer and an increase in the ion density (ID) are prevented and problems of display defects such as image sticking are overcome is particularly useful for active matrix driving liquid crystal display devices with an IPS mode and an FFS mode and can be applied to liquid crystal display devices of liquid crystal televisions, monitors, cellular phones, and smart phones.

12 Claims, 1 Drawing Sheet

(56) References Cited

FOREIGN PATENT DOCUMENTS

| | | |
|---|---|---|
| JP | 2009-109542 A | 5/2009 |
| JP | 2009-163014 A | 7/2009 |
| JP | 2010-189560 A | 9/2010 |
| JP | 2010-250117 A | 11/2010 |
| JP | 2010-256509 A | 11/2010 |
| JP | 2010-260997 A | 11/2010 |
| JP | 2011-141356 A | 7/2011 |
| JP | 2011-186043 A | 9/2011 |
| TW | 200621898 A | 7/2006 |
| WO | 2004/099343 A1 | 11/2004 |
| WO | 2010/095506 A1 | 8/2010 |

OTHER PUBLICATIONS

International Search Report dated Feb. 18, 2014, issued in corresponding application No. PCT/JP2013/081728(2 pages).

* cited by examiner

LIQUID CRYSTAL DISPLAY DEVICE

TECHNICAL FIELD

The present invention relates to a liquid crystal display device.

BACKGROUND ART

Liquid crystal display devices have been used for clocks, calculators, household electric appliances, measuring instruments, panels for automobiles, word processors, electronic organizers, printers, computers, televisions, etc. Typical examples of a liquid crystal display mode include a TN (twisted nematic) mode, an STN (super twisted nematic) mode, a DS (dynamic scattering) mode, a GH (guest-host) mode, an IPS (in-plane switching) mode, an OCB (optically compensated birefringence) mode, an ECB (electrically controlled birefringence) mode, a VA (vertical alignment) mode, a CSH (color super-homeotropic) mode, and FLC (ferroelectric liquid crystal). The driving method has been changed from conventional static driving to multiplex driving, and passive matrix driving and, recently, active matrix (AM) driving performed using, for example, TFTs (thin film transistors) and TFDs (thin film diodes) have become the predominantly used driving method.

As shown in FIG. 1, typical color liquid crystal display devices include two substrates (1) each having an alignment film (4), a transparent electrode layer (3a) serving as a common electrode and a color filter layer (2) disposed between one of the substrates and its alignment film, and a pixel electrode layer (3b) disposed between the other of the substrates and its alignment film. The substrates are disposed so that the alignment films face each other, and a liquid crystal layer (5) is sandwiched between the alignment films.

The color filter layer includes a black matrix and a color filter constituted by a red colored layer (R), a green colored layer (G), a blue colored layer (B), and optionally a yellow colored layer (Y).

A liquid crystal material constituting the liquid crystal layer has been highly controlled in terms of impurities because impurities left in the liquid crystal material considerably affect the electrical characteristics of a display device. It has been also known that, regarding a material of the alignment film, the alignment film directly contacts the liquid crystal layer and therefore impurities left in the alignment film moves to the liquid crystal layer, which affects the electrical characteristics of the liquid crystal layer. Thus, the characteristics of liquid crystal display devices resulting from impurities in the material of the alignment film are being studied.

Similarly to the alignment film material, a material such as an organic pigment used for the color filter layer is also assumed to affect the liquid crystal layer because of impurities contained in the material. However, it has been considered that, since there are an alignment film and a transparent electrode between the color filter layer and the liquid crystal layer, the direct influence of impurities on the liquid crystal layer is much smaller than the influence of impurities contained in the alignment film material. However, in general, the alignment film has a thickness of merely 0.1 µm or less, and even a common electrode which serves as a transparent electrode and is used on the color filter layer side and whose thickness is increased to increase the electrical conductivity has a thickness of merely 0.5 µm or less. Therefore, the color filter layer and the liquid crystal layer are not present in an environment in which they are completely isolated. The color filter layer may cause display defects such as white streaks, alignment unevenness, and image sticking because the voltage holding ratio (VHR) of the liquid crystal layer is decreased and the ion density (ID) is increased due to impurities contained in the color filter layer, the impurities affecting the liquid crystal layer through the alignment film and transparent electrode.

To overcome the display defects caused by impurities contained in a pigment constituting the color filter, the following methods have been studied: a method for controlling the elution of impurities that move into liquid crystal by using a pigment in which the proportion of an extract resulting from ethyl formate is adjusted to a particular value or less (PTL 1) and a method for controlling the elution of impurities that move into liquid crystal by specifying a pigment in a blue colored layer (PTL 2). However, these methods are not so different from a method in which the amount of impurities in a pigment is simply decreased. In a current situation in which a purification technique of pigments has advanced, these methods do not provide a sufficient improvement to overcome the display defects.

On the other hand, focusing on the relationship between a liquid crystal composition and organic impurities contained in a color filter, there are disclosed a method in which the difficulty of dissolving the organic impurities in the liquid crystal layer is expressed as a hydrophobic parameter of liquid crystal molecules in the liquid crystal layer, and the hydrophobic parameter is set to be equal to or more than a particular value; and a method in which, with consideration of a correlation between the hydrophobic parameter and an —$OCF_3$ group at the liquid crystal molecule terminal, a liquid crystal composition containing, at a certain proportion or more, a liquid crystal compound having an —$OCF_3$ group at the liquid crystal molecule terminal is prepared (PTL 3).

However, in the disclosure of PTL 3, the essence of the invention is also to suppress the influence of impurities in a pigment on the liquid crystal layer. The direct relationship between a structure of a liquid crystal material and a structure of a coloring material such as a dye/pigment used for a color filter has not been studied, which does not overcome the problems of display defects of highly advanced liquid crystal display devices.

CITATION LIST

Patent Literature

PTL 1: Japanese Unexamined Patent Application Publication No. 2000-19321

PTL 2: Japanese Unexamined Patent Application Publication No. 2009-109542

PTL 3: Japanese Unexamined Patent Application Publication No. 2000-192040

SUMMARY OF INVENTION

Technical Problem

The present invention provides a liquid crystal display device in which a decrease in the voltage holding ratio (VHR) of a liquid crystal layer and an increase in the ion density (ID) are prevented and problems of display defects such as white streaks, alignment unevenness, and image sticking are overcome by using a particular liquid crystal composition and a color filter that uses a particular dye and/or pigment.

Solution to Problem

To solve the above problems, the inventors of the present invention have conducted thorough studies on the combination between a coloring material such as a dye/pigment constituting the color filter and a structure of a liquid crystal material constituting the liquid crystal layer. As a result, the inventors have found that, in a liquid crystal display device including a particular liquid crystal material structure and a color filter that uses a dye and/or pigment having a particular structure, a decrease in the voltage holding ratio (VHR) of a liquid crystal layer and an increase in the ion density (ID) are prevented and problems of display defects such as white streaks, alignment unevenness, and image sticking are overcome. Thus, the present invention has been completed.

That is, the present invention provides a liquid crystal display device including a first substrate, a second substrate, a liquid crystal composition layer sandwiched between the first substrate and the second substrate, a color filter constituted by a black matrix and at least RGB three color pixel portions, a pixel electrode, and a common electrode, wherein the liquid crystal composition layer contains a liquid crystal composition containing at least one compound represented by general formula (I),

[Chem. 1]

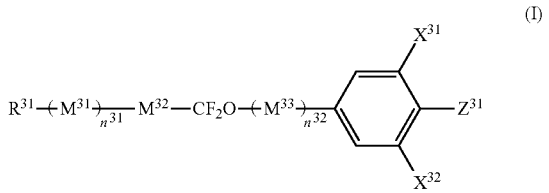
(I)

(in general formula, $R^{31}$ represents an alkyl group or alkoxy group having 1 to 10 carbon atoms or an alkenyl group or alkenyloxy group having 2 to 10 carbon atoms, $M^{31}$ to $M^{33}$ each independently represent a trans-1,4-cyclohexylene group or a 1,4-phenylene group, one or two —$CH_2$— in the trans-1,4-cyclohexylene group may be substituted with —O— unless oxygen atoms directly bond to each other, one or two hydrogen atoms in the phenylene group may be substituted with a fluorine atom, $X^{31}$ and $X^{32}$ each independently represent a hydrogen atom or a fluorine atom, $Z^{31}$ represents a fluorine atom, a trifluoromethoxy group, or a trifluoromethyl group, $n^{31}$ and $n^{32}$ each independently represent 0, 1, or 2, $n^{31}+n^{32}$ represents 0, 1, or 2, and when a plurality of $M^{31}$ or $M^{33}$ are present, the plurality of $M^{31}$ may be the same or different or the plurality of $M^{33}$ may be the same or different), and at least one compound selected from the group consisting of compounds represented by general formula (II-a) to general formula (II-e),

[Chem. 2]

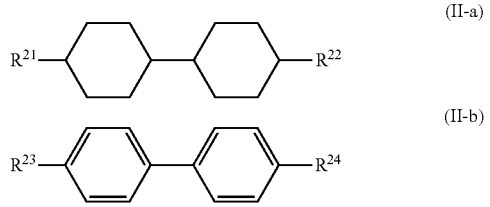

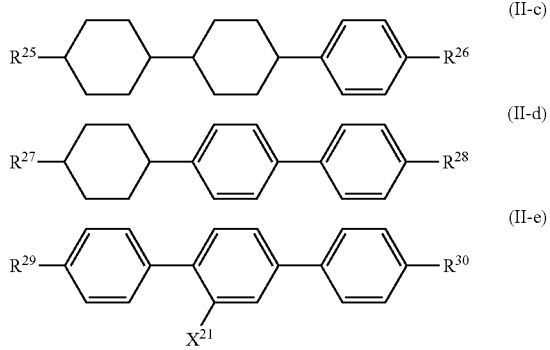

(in general formulae, $R^{21}$ to $R^{30}$ each independently represent an alkyl group having 1 to 10 carbon atoms or an alkenyl group having 2 to 10 carbon atoms, and $X^{21}$ represents a hydrogen atom or a fluorine atom);

the RGB three color pixel portions contain, in a G pixel portion as a coloring material, a halogenated metal phthalocyanine pigment having a central metal selected from the group consisting of Al, Si, Sc, Ti, V, Mg, Fe, Co, Ni, Zn, Ga, Ge, Y, Zr, Nb, In, Sn, and Pb; when the central metal is a trivalent metal, any one of a halogen atom, a hydroxyl group, and a sulfonic acid group bonds to the central metal or the central metal forms an oxo-bridge or thio-bridge; and, when the central metal is a tetravalent metal, a single oxygen atom or any two of a halogen atom, a hydroxyl group, and a sulfonic acid group which may be the same or different bond to the central metal.

Advantageous Effects of Invention

According to the liquid crystal display device of the present invention, a decrease in the voltage holding ratio (VHR) of a liquid crystal layer and an increase in the ion density (ID) can be prevented and display defects such as white streaks, alignment unevenness, and image sticking can be prevented by using a particular liquid crystal composition and a color filter that uses a particular pigment.

Figure 1:
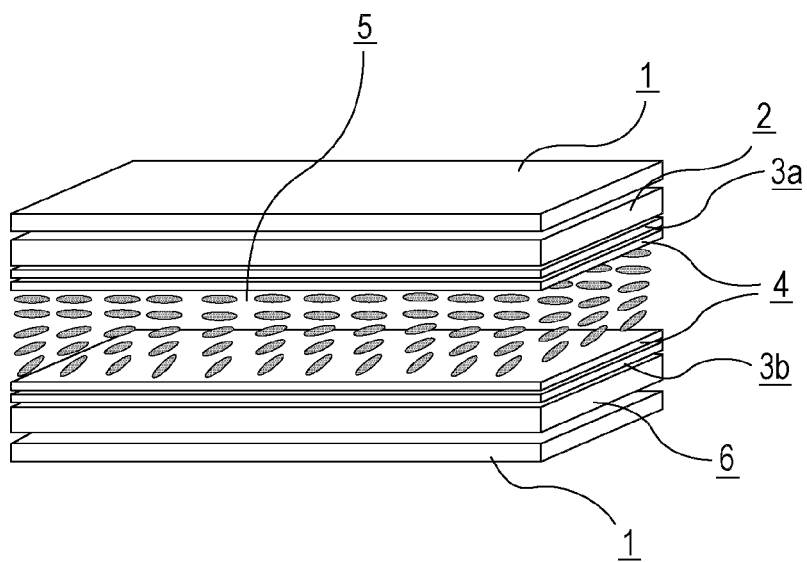
FIG. 1 is a diagram showing an example of a known typical liquid crystal display device.

REFERENCE SIGNS LIST 1 substrate
2 color filter layer
2a color filter layer containing a particular pigment
3a transparent electrode layer (common electrode)
3b pixel electrode layer
4 alignment film
5 liquid crystal layer
5a liquid crystal layer containing a particular liquid crystal composition

DESCRIPTION OF EMBODIMENTS

Figure 2:
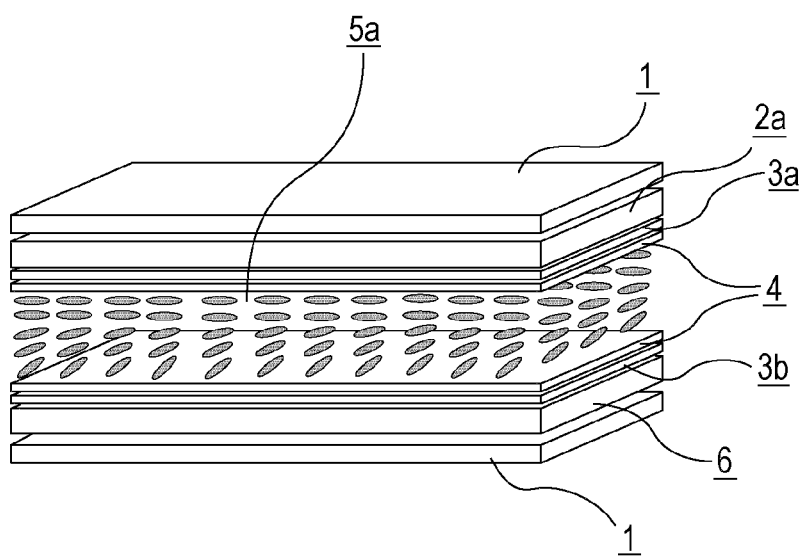
FIG. 2 is a diagram showing an example of a liquid crystal display device of the present invention.

FIG. 2 shows an example of a liquid crystal display device of the present invention. First and second substrates (1) each have an alignment film (4). A transparent electrode layer (3a) serving as a common electrode and a color filter layer (2a) containing a particular pigment are disposed between one of the substrates and its alignment film. A pixel electrode layer (3b) is disposed between the other of the substrates and its alignment film. The substrates are disposed so that the alignment films face each other. A liquid crystal layer (5a) containing a particular liquid crystal composition is sandwiched between the alignment films.

The two substrates in the display device are laminated with a sealing material disposed in a peripheral region. In many cases, a particulate spacer or a columnar spacer composed of a resin and formed by photolithography is disposed between the substrates to keep the distance between the substrates.

(Liquid Crystal Composition Layer)

A liquid crystal composition layer in the liquid crystal display device of the present invention contains a liquid crystal composition containing at least one compound represented by general formula (I),

[Chem. 3]

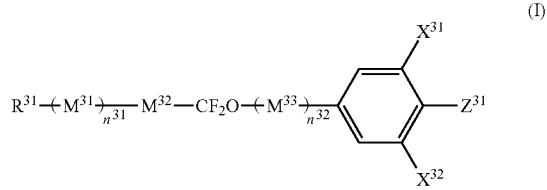

(in general formula, $R^{31}$ represents an alkyl group or alkoxy group having 1 to 10 carbon atoms or an alkenyl group or alkenyloxy group having 2 to 10 carbon atoms, $M^{31}$ to $M^{33}$ each independently represent a trans-1,4-cyclohexylene group or a 1,4-phenylene group, one or two —$CH_2$— in the trans-1,4-cyclohexylene group may be substituted with —O— unless oxygen atoms directly bond to each other, one or two hydrogen atoms in the phenylene group may be substituted with a fluorine atom, $X^{31}$ and $X^{32}$ each independently represent a hydrogen atom or a fluorine atom, $Z^{31}$ represents a fluorine atom, a trifluoromethoxy group, or a trifluoromethyl group, $n^{31}$ and $n^{32}$ each independently represent 0, 1, or 2, $n^{31}+n^{32}$ represents 0, 1, or 2, and when a plurality of $M^{31}$ or $M^{33}$ are present, the plurality of $M^{31}$ may be the same or different or the plurality of $M^{33}$ may be the same or different), and at least one compound selected from the group consisting of compounds represented by general formula (II-a) to general formula (II-e),

[Chem. 4]

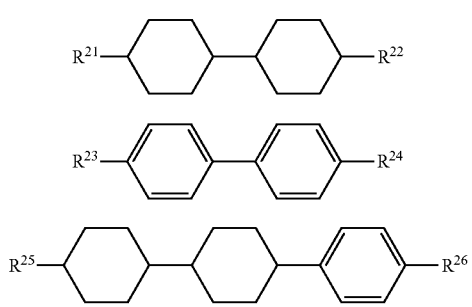

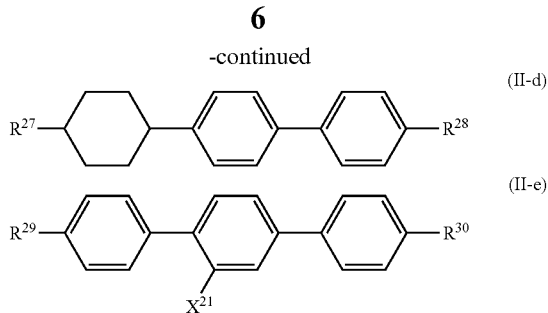

(in general formulae, $R^{21}$ to $R^{30}$ each independently represent an alkyl group having 1 to 10 carbon atoms or an alkenyl group having 2 to 10 carbon atoms, and $X^{21}$ represents a hydrogen atom or a fluorine atom).

In general formula (I), when the ring structure to which $R^{31}$ bonds is a phenyl group (aromatic group), $R^{31}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which $R^{31}$ bonds is a saturated ring structure such as cyclohexane, pyran, or dioxane, $R^{31}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, $R^{31}$ preferably represents an alkyl group. When an importance is given to production of a liquid crystal display element having high response speed due to low viscosity, $R^{31}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, $R^{31}$ preferably represents an alkoxy group as one solution strategy. In another solution strategy, multiple types of $R^{31}$ are preferably used together. For example, $R^{31}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms. $M^{31}$ to $M^{33}$ preferably have the following structures.

[Chem. 5]

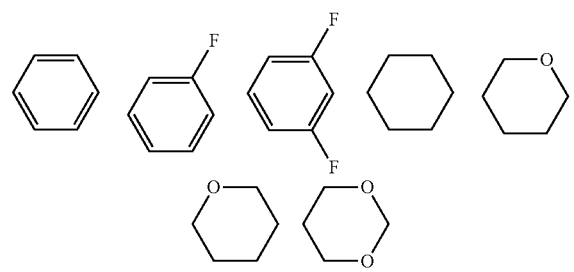

$M^{31}$ preferably has the following structures.

[Chem. 6]

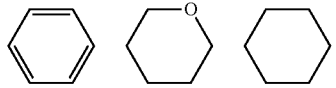

$M^{31}$ more preferably has the following structures.

[Chem. 7]

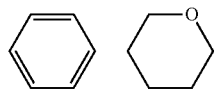

$M^{32}$ preferably has the following structures.

[Chem. 8]

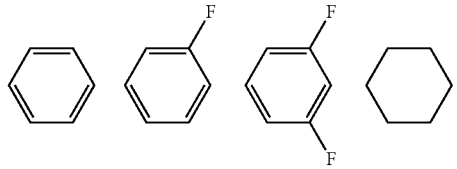

$M^{32}$ more preferably has the following structures.

[Chem. 9]

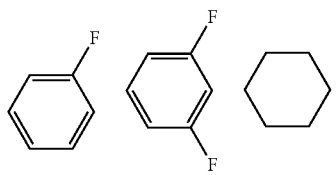

$M^{32}$ further preferably has the following structures.

[Chem. 10]

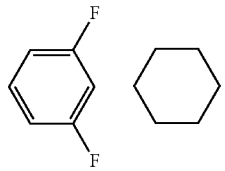

$M^{33}$ preferably has the following structures.

[Chem. 11]

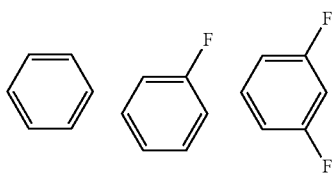

$M^{33}$ more preferably has the following structures.

[Chem. 12]

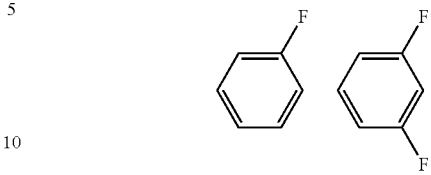

$M^{33}$ further preferably has the following structure.

[Chem. 13]

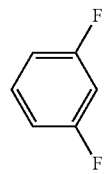

At least one of $X^{31}$ and $X^{32}$ preferably represents a fluorine atom and both of $X^{31}$ and $X^{32}$ more preferably represent fluorine atoms.

$Z^{31}$ preferably represents a fluorine atom or a trifluoromethoxy group.

Regarding the combination of $X^{31}$, $X^{32}$, and $Z^{31}$, in one embodiment, $X^{31}$=F, $X^{32}$=F, and $Z^{31}$=F. In another embodiment, $X^{31}$=F, $X^{32}$=H, and $Z^{31}$=F. In still another embodiment, $X^{31}$=F, $X^{32}$=H, and $Z^{31}$=OCF3. In still another embodiment, $X^{31}$=F, $X^{32}$=F, and $Z^{31}$=OCF3. In still another embodiment, $X^{31}$=H, $X^{32}$=H, and $Z^{31}$=OCF3.

$n^{31}$ preferably represents 1 or 2, $n^{32}$ preferably represents 0 or 1 and more preferably 0, and $n^{31}+n^{32}$ preferably represents 1 or 2 and more preferably 2.

More specifically, the compound represented by general formula (I) preferably includes compounds represented by general formula (I-a) to general formula (I-f) below.

[Chem. 14]

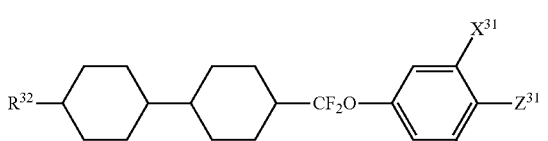
(I-a)

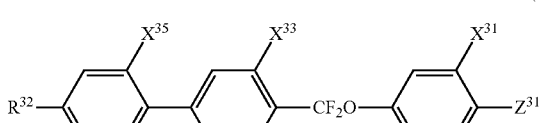
(I-b)

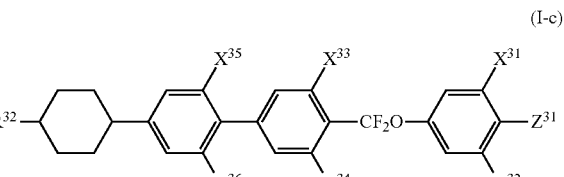
(I-c)

-continued

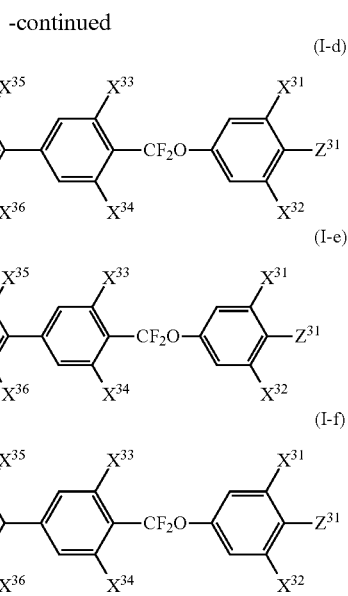

(In general formulae, $R^{32}$ represents an alkyl group or alkoxy group having 1 to 10 carbon atoms or an alkenyl group or alkenyloxy group having 2 to 10 carbon atoms, $X^{31}$ to $X^{38}$ each independently represent a hydrogen atom or a fluorine atom, and $Z^{31}$ represents a fluorine atom, a trifluoromethoxy group, or a trifluoromethyl group.)

In general formula (I-a) to general formula (I-f), when the ring structure to which $R^{32}$ bonds is a phenyl group (aromatic group), $R^{32}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which $R^{32}$ bonds is a saturated ring structure such as cyclohexane, pyran, or dioxane, $R^{32}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, $R^{31}$ preferably represents an alkyl group. When an importance is given to production of a liquid crystal display element having high response speed due to low viscosity, $R^{31}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, $R^{31}$ preferably represents an alkoxy group as one solution strategy. In another solution strategy, multiple types of $R^{31}$ are preferably used together. For example, $R^{31}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms.

At least one of $X^{31}$ and $X^{32}$ preferably represents a fluorine atom and both of $X^{31}$ and $X^{32}$ more preferably represent fluorine atoms.

$Z^{31}$ preferably represents a fluorine atom or a trifluoromethoxy group.

Regarding the combination of $X^{31}$, $X^{32}$, and $Z^{31}$, in one embodiment, $X^{31}$=F, $X^{32}$=F, and $Z^{31}$=F. In another embodiment, $X^{31}$=F, $X^{32}$=H, and $Z^{31}$=F. In still another embodiment, $X^{31}$=F, $X^{32}$=H, and $Z^{31}$=OCF3. In still another embodiment, $X^{31}$=F, $X^{32}$=F, and $Z^{31}$=OCF3. In still another embodiment, $X^{31}$=H, $X^{32}$=H, and $Z^{31}$=OCF3.

$n^{31}$ preferably represents 1 or 2, $n^{32}$ preferably represents 0 or 1 and more preferably 0, and $n^{31}+n^{32}$ preferably represents 1 or 2 and more preferably 2.

At least one of $X^{33}$ and $X^{34}$ preferably represents a fluorine atom and both of $X^{33}$ and $X^{34}$ more preferably represent fluorine atoms.

At least one of $X^{35}$ and $X^{36}$ preferably represents a fluorine atom. However, it is not preferred that both of $X^{35}$ and $X^{36}$ represent fluorine atoms in view of Tni, solubility at low temperature, and chemical stability in the form of a liquid crystal display element, though there is a good effect when Δ∈ is increased.

At least one of $X^{37}$ and $X^{38}$ preferably represents a hydrogen atom and both of $X^{37}$ and $X^{38}$ more preferably represent hydrogen atoms. It is not preferred that at least one of $X^{37}$ and $X^{38}$ represent a fluorine atom in view of Tni, solubility at low temperature, and chemical stability in the form of a liquid crystal display element.

One to eight of the compounds represented by general formula (I) are preferably contained and one to five of the compounds are particularly preferably contained. The content of the compounds is preferably 3% to 50% by mass and more preferably 5% to 40% by mass.

In general formula (II-a) to general formula (II-e), when the ring structure to which each of $R^{21}$ to $R^{30}$ bonds is a phenyl group (aromatic group), each of $R^{21}$ to $R^{30}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which each of $R^{21}$ to $R^{30}$ bonds is a saturated ring structure such as cyclohexane, pyran, or dioxane, each of $R^{21}$ to $R^{30}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, each of $R^{21}$ to $R^{30}$ preferably represents an alkyl group. When an importance is given to production of a liquid crystal display element having high response speed due to low viscosity, each of $R^{21}$ to $R^{30}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, each of $R^{21}$ to $R^{30}$ preferably represents an alkoxy group as one solution strategy. In another solution strategy, multiple types of $R^{21}$ to $R^{30}$ are preferably used together. For example, each of $R^{21}$ to $R^{30}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms.

$R^{21}$ and $R^{22}$ preferably represent an alkyl group or an alkenyl group and at least one of $R^{21}$ and $R^{22}$ preferably represents an alkenyl group. A compound in which both $R^{21}$ and $R^{22}$ are alkenyl groups is suitably used to improve the response speed, but is not preferred in the case where the chemical stability of a liquid crystal display element is improved. At least one of $R^{23}$ and $R^{24}$ preferably represents an alkyl group, an alkoxy group, or an alkenyl group having 4 or 5 carbon atoms. To achieve good balance between response speed and Tni, at least one of $R^{23}$ and $R^{24}$ preferably represents an alkenyl group. To achieve good balance between response speed and solubility at low temperature, at least one of $R^{23}$ and $R^{24}$ preferably represents an alkoxy group.

At least one of $R^{25}$ and $R^{26}$ preferably represents an alkyl group, an alkoxy group, or an alkenyl group having 2 to 5 carbon atoms. To achieve good balance between response speed and Tni, at least one of $R^{25}$ and $R^{26}$ preferably represents an alkenyl group. To achieve good balance between response speed and solubility at low temperature, at least one of $R^{25}$ and $R^{26}$ preferably represent an alkoxy group. More preferably, $R^{25}$ represents an alkenyl group and $R^{26}$ represents an alkyl group. It is also preferred that $R^{25}$ represent an alkyl group and $R^{26}$ represent an alkoxy group.

At least one of $R^{27}$ and $R^{28}$ preferably represents an alkyl group, an alkoxy group, or an alkenyl group having 2 to 5 carbon atoms. To achieve good balance between response speed and Tni, at least one of $R^{27}$ and $R^{28}$ preferably represents an alkenyl group. To achieve good balance between response speed and solubility at low temperature, at least one of $R^{27}$ and $R^{28}$ preferably represents an alkoxy group. More preferably, $R^{27}$ represents an alkyl group or an alkenyl group and $R^{28}$ represents an alkyl group. It is also preferred that $R^{27}$ represent an alkyl group and $R^{28}$ represent an alkoxy group. Furthermore, it is particularly preferred that $R^{27}$ represent an alkyl group and $R^{28}$ represent an alkyl group.

$X^{21}$ is preferably a fluorine atom.

One to ten of the compounds represented by general formula (II-a) to general formula (II-e) are preferably contained and one to eight of the compounds are particularly preferably contained. The content of the compounds is preferably 5% to 80% by mass, more preferably 10% to 70% by mass, and particularly preferably 20% to 60% by mass.

The liquid crystal composition layer in the liquid crystal display device of the present invention may further contain at least one compound selected from the group consisting of compounds represented by general formula (III-a) to general formula (III-f).

[Chem. 15]

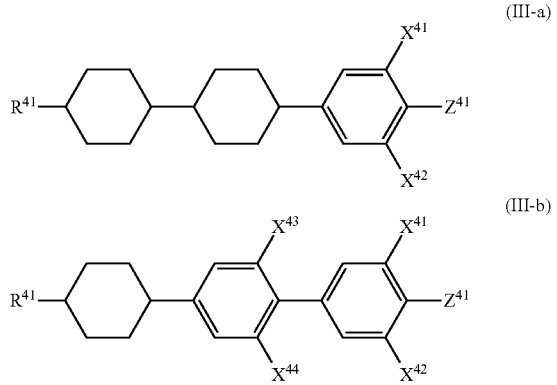
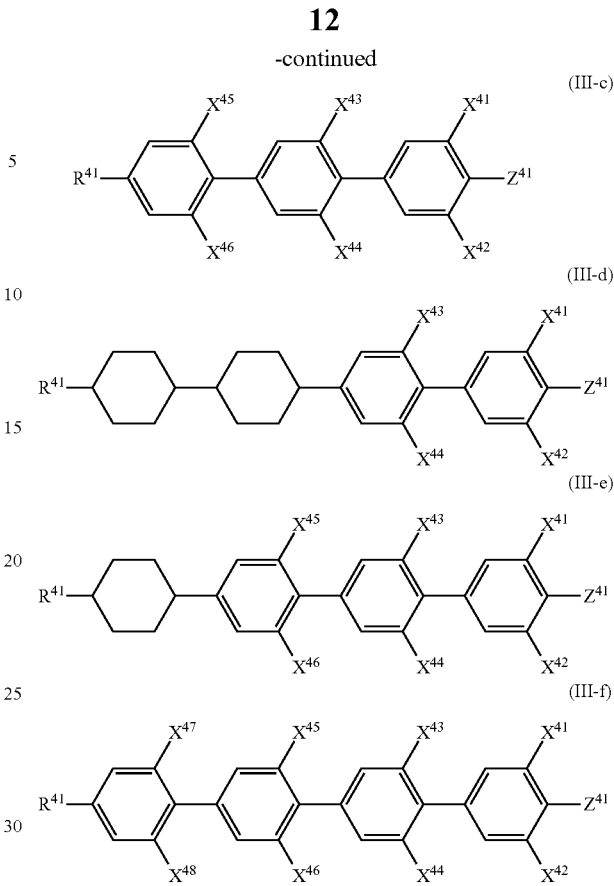

(In general formulae, $R^{41}$ represents an alkyl group or alkoxy group having 1 to 10 carbon atoms or an alkenyl group or alkenyloxy group having 2 to 10 carbon atoms, $X^{41}$ to $X^{48}$ each independently represent a hydrogen atom or a fluorine atom, and $Z^{41}$ represents a fluorine atom, a trifluoromethoxy group, or a trifluoromethyl group.)

In general formula (IIIa) to general formula (IIIf), when the ring structure to which $R^{41}$ bonds is a phenyl group (aromatic group), $R^{41}$ preferably represents a linear alkyl group having 1 to 5 carbon atoms, a linear alkoxy group having 1 to 4 (or more) carbon atoms, or an alkenyl group having 4 or 5 carbon atoms. When the ring structure to which $R^{41}$ bonds is a saturated ring structure such as cyclohexane, pyran, or dioxane, $R^{41}$ preferably represents a linear alkyl group having 1 to 5 carbon atoms, a linear alkoxy group having 1 to 4 (or more) carbon atoms, or a linear alkenyl group having 2 to 5 carbon atoms.

When an importance is given to good chemical stability to heat and light, $R^{41}$ preferably represents an alkyl group. When an importance is given to production of a liquid crystal display element having high response speed due to low viscosity, $R^{41}$ preferably represents an alkenyl group. Furthermore, for the purpose of decreasing the viscosity, increasing the nematic-isotropic phase transition temperature (Tni), and further improving the response speed, an alkenyl group whose terminal bond is not an unsaturated bond is preferably used and an alkenyl group having a methyl group bonded to the terminal of the alkenyl group is particularly preferably used. When an importance is given to high solubility at low temperature, $R^{41}$ preferably represents an alkoxy group as one solution strategy. In another solution strategy, multiple types of $R^{41}$ are preferably used together. For example, $R^{41}$ is preferably a combination of compounds having alkyl groups or alkenyl groups having 2, 3, and 4 carbon atoms, a combination of compounds having alkyl groups or alkenyl groups having 3 and 5 carbon atoms, or a combination of compounds having alkyl groups or alkenyl groups having 3, 4, and 5 carbon atoms.

At least one of $X^{41}$ and $X^{42}$ preferably represents a fluorine atom and both of $X^{41}$ and $X^{42}$ more preferably represent fluorine atoms.

$Z^{41}$ preferably represents a fluorine atom or a trifluoromethoxy group.

Regarding the combination of $X^{41}$, $X^{42}$, and $Z^{41}$, in one embodiment, $X^{41}$=F, $X^{42}$=F, and $Z^{41}$=F. In another embodiment, $X^{41}$=F, $X^{42}$=H, and $Z^{41}$=F. In still another embodiment, $X^{41}$=F, $X^{42}$=H, and $Z^{41}$=OCF3. In still another embodiment, $X^{41}$=F, $X^{42}$=F, and $Z^{41}$=OCF3. In still another embodiment, $X^{41}$=H, $X^{42}$=H, and $Z^{41}$=OCF3. At least one of $X^{43}$ and $X^{44}$ preferably represents a fluorine atom and both of $X^{43}$ and $X^{44}$ preferably represent fluorine atoms to increase $\Delta\in$. However, it is not preferred that both of $X^{43}$ and $X^{44}$ represent fluorine atoms in terms of improvement in solubility at low temperature.

At least one of $X^{45}$ and $X^{46}$ preferably represents a hydrogen atom and both of $X^{45}$ and $X^{46}$ more preferably represent hydrogen atoms. The use of fluorine atoms in a large amount is not preferred in view of Tni, solubility at low temperature, and chemical stability in the form of a liquid crystal display element.

At least one of $X^{47}$ and $X^{48}$ preferably represents a hydrogen atom and both of $X^{47}$ and $X^{48}$ more preferably represent hydrogen atoms. It is not preferred that at least one of $X^{47}$ and $X^{48}$ represent a fluorine atom in view of Tni, solubility at low temperature, and chemical stability in the form of a liquid crystal display element.

One to ten of the compounds selected from the group consisting of the compounds represented by general formula (III-a) to general formula (III-f) are preferably contained and one to eight of the compounds are more preferably contained. The content of the compounds is preferably 5% to 50% by mass and more preferably 10% to 40% by mass.

In the liquid crystal composition of the liquid crystal composition layer in the liquid crystal display device of the present invention, $\Delta\in$ at 25° C. is preferably +3.5 or more and more preferably +3.5 to +15.0. Furthermore, $\Delta n$ at 25° C. is preferably 0.08 to 0.14 and more preferably 0.09 to 0.13. More specifically, $\Delta n$ is preferably 0.10 to 0.13 when a small cell gap is employed and 0.08 to 0.10 when a large cell gap is employed. Moreover, η at 20° C. is preferably 10 to 45 mPa·s, more preferably 10 to 25 mPa·s, and particularly preferably 10 to 20 mPa·s. $T_{ni}$ is preferably 60° C. to 120° C., more preferably 70° C. to 100° C., and particularly preferably 70° C. to 85° C.

In addition to the above compounds, the liquid crystal composition in the present invention may contain typical nematic liquid crystal, smectic liquid crystal, and cholesteric liquid crystal.

The liquid crystal composition in the present invention may contain at least one polymerizable compound for the purpose of producing a liquid crystal display element with, for example, a PS mode, a transverse electric field-type PSA mode, or a transverse electric field-type PSVA mode. For example, a photopolymerizable monomer whose polymerization proceeds with energy rays such as light can be used as the polymerizable compound. In terms of structure, a polymerizable compound having a liquid crystal skeleton formed by bonding a plurality of six-membered rings, such as a biphenyl derivative or a terphenyl derivative is exemplified. More specifically, the polymerizable compound is preferably a bifunctional monomer represented by general formula (V).

[Chem. 16]

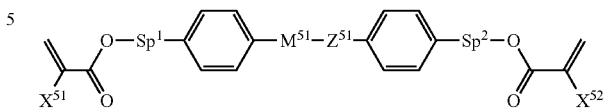

(V)

(In general formula, $X^{51}$ and $X^{52}$ each independently represent a hydrogen atom or a methyl group and $Sp^1$ and $Sp^2$ each independently represent a single bond, an alkylene group having 1 to 8 carbon atoms, or $-O-(CH_2)_s-$ (where s represents an integer of 2 to 7 and the oxygen atom bonds to an aromatic ring); $Z^{51}$ represents $-OCH_2-$, $-CH_2O-$, $-COO-$, $-OCO-$, $-CF_2O-$, $-OCF_2-$, $-CH_2CH_2-$, $-CF_2CF_2-$, $-CH=CH-OCO-$, $-CH=CH-OCO-$, $-COO-CH=CH-$, $-OCO-CH=CH-$, $-COO-CH_2CH_2-$, $-OCO-CH_2CH_2-$, $-CH_2CH_2-COO-$, $-CH_2CH_2-OCO-$, $-COO-CH_2-$, $-OCO-CH_2-$, $-CH_2-COO-$, $-CH_2-OCO-$, $-CY^1=CY^2-$ (where $Y^1$ and $Y^2$ each independently represent a fluorine atom or a hydrogen atom), $-C\equiv C-$, or a single bond; and $M^{51}$ represents a 1,4-phenylene group, a trans-1,4-cyclohexylene group, or a single bond and, in all the 1,4-phenylene groups in general formula, any of hydrogen atoms may be substituted with fluorine atoms.)

The polymerizable compound is preferably any of a diacrylate derivative in which $X^{51}$ and $X^{52}$ each represent a hydrogen atom and a dimethacrylate derivative in which $X^{51}$ and $X^{52}$ each represent a methyl group, and is also preferably a compound in which one of $X^{51}$ and $X^{52}$ represents a hydrogen atom and the other represents a methyl group. Among these compounds, the diacrylate derivative has the highest rate of polymerization, the dimethacrylate derivative has a low rate of polymerization, and the asymmetrical compound has an intermediate rate of polymerization. A preferred one can be used in accordance with the applications. In a PSA display element, the dimethacrylate derivative is particularly preferably used.

$Sp^1$ and $Sp^2$ each independently represent a single bond, an alkylene group having 1 to 8 carbon atoms, or $-O-(CH_2)_s-$. In a PSA display element, at least one of $Sp^1$ and $Sp^2$ preferably represents a single bond. A compound in which $Sp^1$ and $Sp^2$ each represent a single bond or a compound in which one of $Sp^1$ and $Sp^2$ represents a single bond and the other represents an alkylene group having 1 to 8 carbon atoms or $-O-(CH_2)_s-$ is preferred. In this case, an alkyl group having 1 to 4 carbon atoms is preferred and s is preferably 1 to 4.

$Z^{51}$ preferably represents $-OCH_2-$, $-CH_2O-$, $-COO-$, $-OCO-$, $-CF_2O-$, $-OCF_2-$, $-CH_2CH_2-$, $-CF_2CF_2-$, or a single bond, more preferably $-COO-$, $-OCO-$, or a single bond, and particularly preferably a single bond.

$M^{51}$ represents a 1,4-phenylene group in which any of hydrogen atoms may be substituted with fluorine atoms, a trans-1,4-cyclohexylene group, or a single bond and preferably represents the 1,4-phenylene group or a single bond. When $M^{51}$ represents a ring structure other than a single bond, $Z^{51}$ preferably represents a linking group other than a single bond. When $M^{51}$ represents a single bond, $Z^{51}$ preferably represents a single bond.

In view of the foregoing, the ring structure between $Sp^1$ and $Sp^2$ in general formula (V) is preferably the following structure.

In the case where $M^{51}$ represents a single bond and the ring structure is constituted by two rings in general formula (V), the ring structure is preferably represented by formula (Va-1) to formula (Va-5) below, more preferably represented by formula (Va-1) to formula (Va-3), and particularly preferably represented by formula (Va-1).

[Chem. 17]

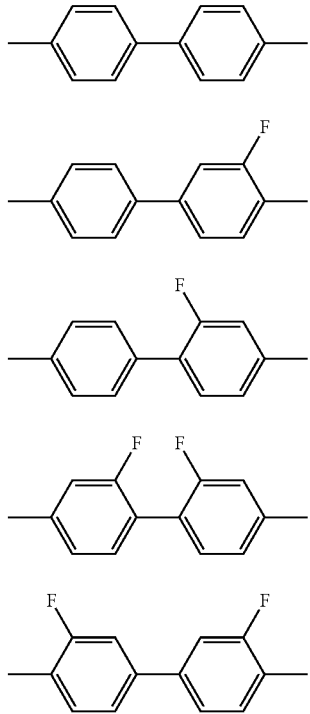

(In formulae, both ends bond to $Sp^1$ and $Sp^2$.)

The anchoring strength after the polymerization of the polymerizable compound having such a skeleton is suitable for PSA-type liquid crystal display elements, and a good alignment state is achieved. Therefore, the display unevenness is suppressed or completely prevented.

Accordingly, the polymerizable compound is particularly preferably represented by general formula (V-1) to general formula (V-4) and most preferably represented by general formula (V-2).

[Chem. 18]

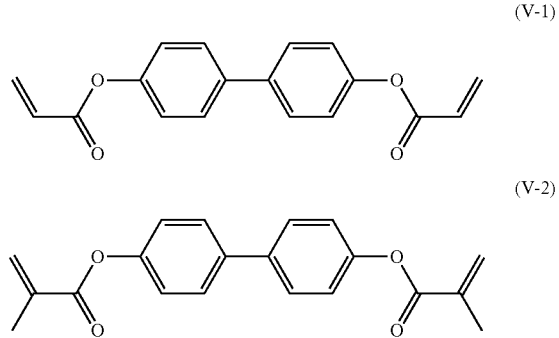

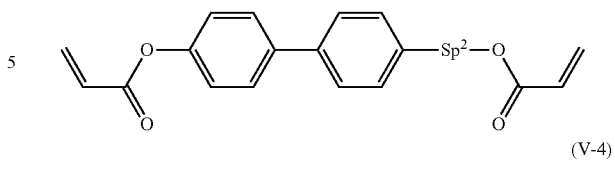

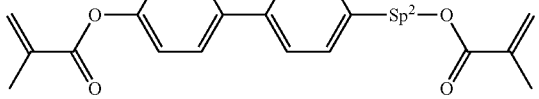

(In general formulae, $Sp^2$ represents an alkylene group having 2 to 5 carbon atoms.)

In the case where the polymerizable compound is added to the liquid crystal composition of the present invention, polymerization proceeds without a polymerization initiator, but a polymerization initiator may be contained to facilitate the polymerization. Examples of the polymerization initiator include benzoin ethers, benzophenones, acetophenones, benzylketals, and acylphosphine oxides.

The liquid crystal composition containing the polymerizable compound in the present invention is provided with liquid crystal alignment capability by polymerizing the polymerizable compound through irradiation with ultraviolet rays and is used for liquid crystal display elements that control the amount of transmitted light by using the birefringence of the liquid crystal composition. The liquid crystal composition is useful for liquid crystal display elements such as an AM-LCD (active matrix liquid crystal display element), a TN (twisted nematic liquid crystal display element), an STN-LCD (super-twisted nematic liquid crystal display element), an OCB-LCD, and an IPS-LCD (in-plane switching liquid crystal display element). The liquid crystal composition is particularly useful for AM-LCDs and can be used for transmission or reflection-type liquid crystal display elements.

(Color Filter)

A color filter of the present invention is constituted by a black matrix and at least RGB three color pixel portions. The RGB three color pixel portions contain, in a G pixel portion as a coloring material, a halogenated metal phthalocyanine pigment having a central metal selected from the group consisting of Al, Si, Sc, Ti, V, Mg, Fe, Co, Ni, Zn, Ga, Ge, Y, Zr, Nb, In, Sn, and Pb. When the central metal is a trivalent metal, any one of a halogen atom, a hydroxyl group, and a sulfonic acid group bonds to the central metal or the central metal forms an oxo-bridge or thio-bridge. When the central metal is a tetravalent metal, a single oxygen atom or any two of a halogen atom, a hydroxyl group, and a sulfonic acid group which may be the same or different bond to the central metal. The RGB three color pixel portions also preferably contain, as coloring materials, a diketopyrrolopyrrole pigment and/or an anionic red organic dye in an R pixel portion and an ∈-type copper phthalocyanine pigment and/or a cationic blue organic dye in a B pixel portion.

(G Pixel Portion)

The above halogenated metal phthalocyanine pigment in the G pixel portion may be halogenated metal phthalocyanine pigments that belong to the following two groups.

(First Group)

The halogenated metal phthalocyanine pigment is a halogenated metal phthalocyanine pigment having a central metal selected from the group consisting of Al, Si, Sc, Ti, V, Mg, Fe, Co, Ni, Zn, Ga, Ge, Y, Zr, Nb, In, Sn, and Pb and having a structure in which 8 to 16 halogen atoms per molecule of phthalocyanine bond to benzene rings of a phthalocyanine molecule. When the central metal is a trivalent metal, any one of a halogen atom, a hydroxyl group, and a sulfonic acid group (—$SO_3H$) bonds to the central metal. When the central metal is a tetravalent metal, a single oxygen atom or any two of a halogen atom, a hydroxyl group, and a sulfonic acid group which may be the same or different bond to the central metal.

(Second Group)

The halogenated metal phthalocyanine pigment is a pigment composed of a halogenated metal phthalocyanine dimer including, as constitutional units, two molecules of a halogenated metal phthalocyanine having a trivalent central metal selected from the group consisting of Al, Sc, Ga, Y and In and having a structure in which 8 to 16 halogen atoms per molecule of phthalocyanine bond to benzene rings of a phthalocyanine molecule. In the halogenated metal phthalocyanine dimer, the central metals of the constitutional units are bonded to each other through a divalent atomic group selected from the group consisting of an oxygen atom, a sulfur atom, sulfinyl (—SO—), and sulfonyl (—$SO_2$—).

In the halogenated metal phthalocyanine pigment used in the present invention, all the halogen atoms that bond to the benzene rings may be the same or different from each other. Different halogen atoms may bond to a single benzene ring.

A halogenated metal phthalocyanine pigment used in the present invention in which 9 to 15 bromine atoms among 8 to 16 halogen atoms per molecule of phthalocyanine bond to benzene rings of a phthalocyanine molecule shows yellowish bright green and is suitably used in a green pixel portion of a color filter. The halogenated metal phthalocyanine pigment used in the present invention is insoluble or sparingly soluble in water or an organic solvent. The halogenated metal phthalocyanine pigment used in the present invention may be a pigment (also referred to as a "crude pigment") not subjected to a finishing treatment described below or a pigment subjected to a finishing treatment.

The halogenated metal phthalocyanine pigments that belong to the first group and the second group can be represented by general formula (PIG-1) below.

In general formula (PIG-1), the halogenated metal phthalocyanine pigment that belongs to the first group is as follows.

In general formula (PIG-1), $X_1$ to $X_{16}$ each represent a hydrogen atom, a chlorine atom, a bromine atom, or an iodine atom. Four X atoms that bond to a single benzene ring may be the same or different. Among $X_1$ to $X_{16}$ that bond to four benzene rings, 8 to 16 of them are chlorine atoms, bromine atoms, or iodine atoms. M represents a central metal. When halogenated metal phthalocyanine pigments have the same Y, which will be described below, and the same number m of Y, pigments having chlorine atoms, bromine atoms, and iodine atoms in a total number of less than 8 among 16 atoms of $X_1$ to $X_{16}$ show blue, and pigments having chlorine atoms, bromine atoms, and iodine atoms in a total number of 8 or more among 16 atoms of $X_1$ to $X_{16}$ become more yellowish as the total number increases. Y that bonds to the central metal M is a monovalent atomic group selected from the group consisting of a halogen atom such as fluorine, chlorine, bromine, or iodine, an oxygen atom, a hydroxyl group, and a sulfonic acid group; and m represents the number of Y that bonds to the central metal M, m being an integer of 0 to 2.

The value of m is determined on the basis of the valence of the central metal M. When the central metal M is a trivalent metal such as Al, Sc, Ga, Y, or In, m=1 and one of groups selected from the group consisting of fluorine, chlorine, bromine, iodine, a hydroxyl group, or a sulfonic acid group bonds to the central metal. When the central metal M is a tetravalent metal such as Si, Ti, V, Ge, Zr, or Sn, m=2 and a single oxygen atom bonds to the central metal or two of groups selected from the group consisting of fluorine, chlorine, bromine, iodine, a hydroxyl group, and a sulfonic acid group bond to the central metal. If the central metal M is a divalent metal such as Mg, Fe, Co, Ni, Zn, Zr, Sn, or Pb, Y is not present.

In above general formula (PIG-1), the halogenated metal phthalocyanine pigment that belongs to the second group is as follows.

In above general formula (PIG-1), $X_1$ to $X_{16}$ have the same definition as above; the central metal M represents a trivalent metal selected from the group consisting of Al, Sc, Ga, Y, and In; m represents 1; and Y represents the following atomic group.

[Chem. 19]

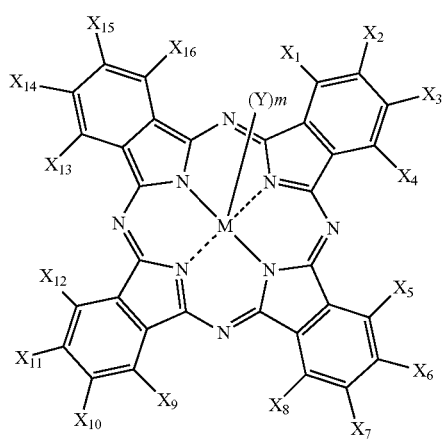

(PIG-1)

[Chem. 20]

Y =

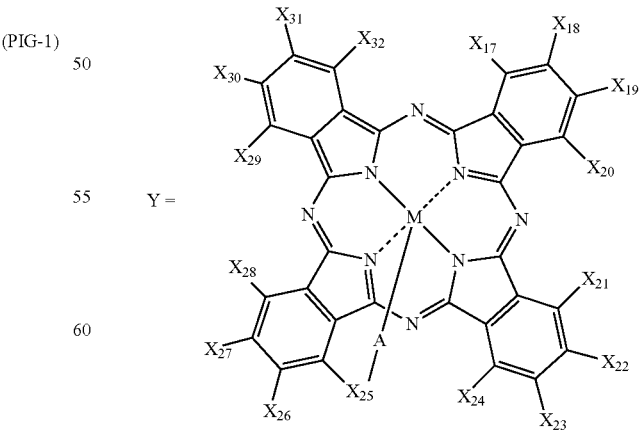

In the chemical structure of the atomic group Y, the central metal M has the same definition as above and $X_{17}$ to $X_{32}$ have the same definition as that of $X_1$ to $X_{16}$ in general formula (PIG-1). A represents a divalent atomic group selected from the group consisting of an oxygen atom, a sulfur atom, sulfinyl (—SO—), and sulfonyl (—SO$_2$—). M in general formula (PIG-1) and M in the atomic group Y are bonded to each other through the divalent atomic group A.

In other words, the halogenated metal phthalocyanine pigment that belongs to the second group is composed of a halogenated metal phthalocyanine dimer including, as constitutional units, two molecules of a halogenated metal phthalocyanine, the two molecules being bonded to each other through the divalent atomic group.

Specific examples of the halogenated metal phthalocyanine pigment represented by general formula (PIG-1) include pigments (1) to (4) below:

(1) a halogenated metal phthalocyanine pigment such as a halogenated tin phthalocyanine pigment, a halogenated nickel phthalocyanine pigment, or a halogenated zinc phthalocyanine pigment, in which the central metal is a divalent metal selected from the group consisting of Mg, Fe, Co, Ni, Zn, Zr, Sn, and Pb and 8 to 16 halogen atoms per molecule of phthalocyanine bond to four benzene rings (note that, among the phthalocyanine pigments, a chlorinated/brominated zinc phthalocyanine pigment such as C.I. Pigment Green 58 is particularly preferred);

(2) a halogenated metal phthalocyanine pigment such as a halogenated chloroaluminum phthalocyanine, in which the central metal is a trivalent metal selected from the group consisting of Al, Sc, Ga, Y, and In, any one of a halogen atom, a hydroxyl group, and a sulfonic acid group bonds to the central metal, and 8 to 16 halogen atoms per molecule of phthalocyanine bond to four benzene rings;

(3) a halogenated metal phthalocyanine pigment such as a halogenated oxytitanium phthalocyanine or a halogenated oxyvanadium phthalocyanine, in which the central metal is a tetravalent metal selected from the group consisting of Si, Ti, V, Ge, Zr, and Sn, a single oxygen atom or any two of a halogen atom, a hydroxyl group, and a sulfonic acid group which may be the same or different bond to the central metal, and 8 to 16 halogen atoms per molecule of phthalocyanine bond to four benzene rings; and (4) a pigment composed of a halogenated metal phthalocyanine dimer, such as a halogenated μ-oxo-aluminum phthalocyanine dimer or a halogenated μ-thio-aluminum phthalocyanine dimer, that includes, as constitutional units, two molecules of a halogenated metal phthalocyanine having a trivalent central metal selected from the group consisting of Al, Sc, Ga, Y and In and having a structure in which 8 to 16 halogen atoms per molecule of phthalocyanine bond to four benzene rings, the central metals of the constitutional units being bonded to each other through a divalent atomic group selected from the group consisting of an oxygen atom, a sulfur atom, sulfinyl, and sulfonyl.

(R Pixel Portion)

The R pixel portion preferably contains a diketopyrrolopyrrole pigment and/or an anionic red organic dye. Specifically, the diketopyrrolopyrrole pigment is preferably C.I. Pigment Red 254, 255, 264, or 272 or C.I. Pigment Orange 71 or 73, more preferably Red 254, 255, 264, or 272, and particularly preferably C.I. Pigment Red 254. The anionic red organic dye is preferably C.I. Solvent Red 124 or Acid Red 52 or 289 and particularly preferably C.I. Solvent Red 124.

(B Pixel Portion)

The B pixel portion preferably contains an ∈-type copper phthalocyanine pigment and/or a cationic blue organic dye. The ∈-type copper phthalocyanine pigment is C.I. Pigment Blue 15:6. The cationic blue organic dye is preferably C.I. Solvent Blue 2, 3, 4, 5, 6, 7, 23, 43, 72, or 124 or C.I. Basic Blue 7 or 26, more preferably C.I. Solvent Blue 7 or C.I. Basic Blue 7, and particularly preferably C.I. Solvent Blue 7.

The RGB three color pixel portions preferably contain, as coloring materials, C.I. Solvent Red 124 in the R pixel portion, a halogenated metal phthalocyanine pigment in the G pixel portion, and C.I. Solvent Blue 7 in the B pixel portion. Herein, the halogenated metal phthalocyanine pigment has a central metal selected from the group consisting of Al, Si, Sc, Ti, V, Mg, Fe, Co, Ni, Zn, Ga, Ge, Y, Zr, Nb, In, Sn, and Pb; when the central metal is a trivalent metal, any one of a halogen atom, a hydroxyl group, and a sulfonic acid group bonds to the central metal or the central metal forms an oxo-bridge or thio-bridge; and, when the central metal is a tetravalent metal, a single oxygen atom or any two of a halogen atom, a hydroxyl group, and a sulfonic acid group which may be the same or different bond to the central metal or the central metal forms an oxo-bridge or thio-bridge.

The RGB three color pixel portions also preferably contain, as coloring materials, C.I. Pigment Red 254 in the R pixel portion, a halogenated metal phthalocyanine pigment in the G pixel portion, and C.I. Pigment Blue 15:6 in the B pixel portion. Herein, the halogenated metal phthalocyanine pigment has a central metal selected from the group consisting of Al, Si, Sc, Ti, V, Mg, Fe, Co, Ni, Zn, Ga, Ge, Y, Zr, Nb, In, Sn, and Pb; when the central metal is a trivalent metal, any one of a halogen atom, a hydroxyl group, and a sulfonic acid group bonds to the central metal or the central metal forms an oxo-bridge or thio-bridge; and, when the central metal is a tetravalent metal, a single oxygen atom or any two of a halogen atom, a hydroxyl group, and a sulfonic acid group which may be the same or different bond to the central metal.

The RGB three color pixel portions preferably further contain, as a coloring material, at least one organic dye or pigment selected from the group consisting of C.I. Pigment Red 177, 242, 166, 167, and 179, C.I. Pigment Orange 38 and 71, C.I. Pigment Yellow 150, 215, 185, 138, and 139, C.I. Solvent Red 89, C.I. Solvent Orange 56, and C.I. Solvent Yellow 21, 82, 83:1, 33, and 162 in the R pixel portion.

The RGB three color pixel portions preferably further contain, as a coloring material, at least one organic dye or pigment selected from the group consisting of C.I. Pigment Yellow 150, 215, 185, and 138 and C.I. Solvent Yellow 21, 82, 83:1, and 33 in the G pixel portion.

The RGB three color pixel portions preferably further contain, as a coloring material, at least one organic dye or pigment selected from the group consisting of C.I. Pigment Blue 1, C.I. Pigment Violet 23, C.I. Basic Blue 7, C.I. Basic Violet 10, C.I. Acid Blue 1, 90, and 83, and C.I. Direct Blue 86 in the B pixel portion.

Preferably, the color filter is constituted by a black matrix, the RGB three color pixel portions, and a Y pixel portion, and the Y pixel portion contains, as a coloring material, at least one yellow organic dye or pigment selected from the group consisting of C.I. Pigment Yellow 150, 215, 185, 138, and 139 and C.I. Solvent Yellow 21, 82, 83:1, 33, and 162.

In the color filter according to the present invention, the chromaticity x and chromaticity y in the XYZ color system of each pixel portion with use of a C light source are preferably as follows from the viewpoint of preventing a decrease in the voltage holding ratio (VHR) of the liquid crystal layer and an increase in the ion density (ID) and suppressing problems of display defects such as white streaks, alignment unevenness, and image sticking.

The chromaticity x in the XYZ color system of the R pixel portion with use of a C light source is preferably 0.58 to 0.69 and more preferably 0.62 to 0.68 and the chromaticity y is preferably 0.30 to 0.36 and more preferably 0.31 to 0.35. Preferably, the chromaticity x is 0.58 to 0.69 and the chromaticity y is 0.30 to 0.36. More preferably, the chromaticity x is 0.62 to 0.68 and the chromaticity y is 0.31 to 0.35.

The chromaticity x in the XYZ color system of the G pixel portion with use of a C light source is preferably 0.19 to 0.32 and more preferably 0.20 to 0.26 and the chromaticity y is preferably 0.60 to 0.76 and more preferably 0.68 to 0.74. Preferably, the chromaticity x is 0.19 to 0.32 and the chromaticity y is 0.60 to 0.76. More preferably, the chromaticity x is 0.20 to 0.26 and the chromaticity y is 0.68 to 0.74.

The chromaticity x in the XYZ color system of the B pixel portion with use of a C light source is preferably 0.11 to 0.16 and more preferably 0.12 to 0.15 and the chromaticity y is preferably 0.04 to 0.15 and more preferably 0.05 to 0.10. Preferably, the chromaticity x is 0.11 to 0.16 and the chromaticity y is 0.04 to 0.15. More preferably, the chromaticity x is 0.12 to 0.15 and the chromaticity y is 0.05 to 0.10.

The chromaticity x in the XYZ color system of the Y pixel portion with use of a C light source is preferably 0.46 to 0.50 and more preferably 0.47 to 0.48 and the chromaticity y is preferably 0.48 to 0.53 and more preferably 0.50 to 0.52. Preferably, the chromaticity x is 0.46 to 0.50 and the chromaticity y is 0.48 to 0.53. More preferably, the chromaticity x is 0.47 to 0.48 and the chromaticity y is 0.50 to 0.52.

Herein, the XYZ color system is a color system approved as the standard color system by the CIE (International Commission on Illumination) in 1931.

The chromaticity in each pixel portion can be adjusted by changing the types of dyes and pigments used and the mixing ratio of the dyes and pigments. For example, in the case of the R pixel, the chromaticity can be adjusted by adding an appropriate amount of a yellow dye/pigment and/or an orange pigment to the red dye/pigment. In the case of the G pixel, the chromaticity can be adjusted by adding an appropriate amount of a yellow dye/pigment to the green dye/pigment. In the case of the B pixel, the chromaticity can be adjusted by adding an appropriate amount of a purple dye/pigment to the blue dye/pigment. The chromaticity can also be adjusted by appropriately controlling the particle size of a pigment.

In the color filter, color filter pixel portions can be formed by a publicly known method. A typical example of a method for forming pixel portions is a photolithography method. In the photolithography method, a photo-curable composition described below is applied onto a surface of a transparent substrate for color filters on the black matrix side and dried by performing heating (pre-baked); pattern exposure is then performed by irradiating the photo-curable composition with ultraviolet rays through a photomask to cure the photo-curable compound in portions corresponding to pixel portions; and unexposed portions are developed with a developer to remove portions other than the pixel portions, whereby the pixel portions are fixed on the transparent substrate. In this method, pixel portions composed of a cured colored coating film of the photo-curable composition are formed on the transparent substrate.

The photo-curable composition described below is prepared for each of the R pixel, G pixel, B pixel, and optionally other pixels of different colors, such as the Y pixel and the above-described process is repeatedly performed. Thus, a color filter including colored pixel portions of the R pixel, G pixel, B pixel, and Y pixel in predetermined positions can be produced.

Examples of a method for applying the photo-curable composition described below onto the transparent substrate composed of glass or the like include a spin coating method, a slit coating method, a roll coating method, and an ink-jet method.

The drying conditions of the coating film of the photo-curable composition applied onto the transparent substrate are normally 50° C. to 150° C. and about 1 to 15 minutes though depending on, for example, the types of components and the mixing ratio. The light used for the photo-curing of the photo-curable composition is preferably ultraviolet light or visible light in a wavelength range of 200 to 500 nm. Various light sources that emit light in this wavelength range can be used.

Examples of a developing method include a puddling method, a dipping method, and a spraying method. After the exposure and development of the photo-curable composition, the transparent substrate on which pixel portions of necessary colors have been formed is washed with water and dried. The thus-produced color filter is heat-treated (post-baked) at 90° C. to 280° C. for a predetermined time using a heating device such as a hot plate, an oven, or the like to remove volatile components in the colored coating film and, at the same time, heat-cure an unreacted photo-curable compound remaining in the cured colored coating film of the photo-curable composition, whereby the color filter is completed.

By using the coloring material for color filters of the present invention together with the liquid crystal composition of the present invention, there can be provided a liquid crystal display device in which a decrease in the voltage holding ratio (VHR) of a liquid crystal layer and an increase in the ion density (ID) are prevented and problems of display defects such as white streaks, alignment unevenness, and image sticking are overcome.

The photo-curable composition is generally produced by the method below. The dye and/or pigment composition for color filters of the present invention, an organic solvent, and a dispersant serving as essential components are stirred and dispersed so as to be uniformly mixed with each other in order to prepare a pigment dispersion liquid for forming pixel portions of a color filter. A photo-curable compound and optionally a thermoplastic resin, a photopolymerization initiator, and the like are added to the pigment dispersion liquid to produce the photo-curable composition.

Examples of the organic solvent used herein include aromatic solvents such as toluene, xylene, and methoxybenzene; acetate solvents such as ethyl acetate, propyl acetate, butyl acetate, propylene glycol monomethyl ether acetate, propylene glycol monoethyl ether acetate, diethylene glycol methyl ether acetate, diethylene glycol ethyl ether acetate, diethylene glycol propyl ether acetate, and diethylene glycol butyl ether acetate; propionate solvents such as ethoxyethyl propionate; alcohol solvents such as methanol and ethanol; ether solvents such as butyl cellosolve, propylene glycol monomethyl ether, diethylene glycol ethyl ether, and diethylene glycol dimethyl ether; ketone solvents such as methyl ethyl ketone, methyl isobutyl ketone, and cyclohexanone; aliphatic hydrocarbon solvents such as hexane; nitrogen compound solvents such as N,N-dimethyl formamide, γ-butyrolactam, N-methyl-2-pyrrolidone, aniline, and pyridine; lactone solvents such as γ-butyrolactone; and carbamates such as a mixture containing methyl carbamate and ethyl carbamate at a ratio of 48:52.

Examples of the dispersant used herein include DISPERBYK 130, DISPERBYK 161, DISPERBYK 162, DISPERBYK 163, DISPERBYK 170, DISPERBYK 171, DISPERBYK 174, DISPERBYK 180, DISPERBYK 182, DISPERBYK 183, DISPERBYK 184, DISPERBYK 185, DISPERBYK 2000, DISPERBYK 2001, DISPERBYK 2020, DISPERBYK 2050, DISPERBYK 2070, DISPERBYK 2096, DISPERBYK 2150, DISPERBYK LPN21116, and DISPERBYK LPN6919 manufactured by BYK-Chemie GmbH; Efka 46, Efka 47, Efka 452, Efka LP4008, Efka 4009, Efka LP4010, Efka LP4050, LP4055, Efka 400, Efka 401, Efka 402, Efka 403, Efka 450, Efka 451, Efka 453, Efka 4540, Efka 4550, Efka LP4560, Efka 120, Efka 150, Efka 1501, Efka 1502, and Efka 1503 manufactured by Efka Chemicals Company; Solsperse 3000, Solsperse 9000, Solsperse 13240, Solsperse 13650, Solsperse 13940, Solsperse 17000, 18000, Solsperse 20000, Solsperse 21000, Solsperse 20000, Solsperse 24000, Solsperse 26000, Solsperse 27000, Solsperse 28000, Solsperse 32000, Solsperse 36000, Solsperse 37000, Solsperse 38000, Solsperse 41000, Solsperse 42000, Solsperse 43000, Solsperse 46000, Solsperse 54000, and Solsperse 71000 manufactured by Lubrizol Corporation; Ajisper PB711, Ajisper PB821, Ajisper PB822, Ajisper PB814, Ajisper PN411, and Ajisper PA111 manufactured by Ajinomoto Co., Ltd.; and synthetic resins which are liquid and water-insoluble at room temperature, e.g., acrylic resins, urethane resins, alkyd resins, natural rosins such as wood rosin, gum rosin, and tall oil rosin, modified rosins such as polymerized rosin, disproportionated rosin, hydrogenated rosin, oxidized rosin, and maleated rosin, and rosin derivatives such as rosin amine, lime rosin, rosin alkylene oxide adducts, rosin alkyd adducts, and rosin-modified phenol. The addition of these dispersants and resins contributes to a reduction in flocculation, an improvement in the dispersion stability of pigments, and an improvement in the viscous property of dispersions.

Examples of a dispersing aid include organic pigment derivatives such as phthalimidemethyl derivatives, sulfonic acid derivatives, N-(dialkylamino)methyl derivatives, and N-(dialkylaminoalkyl)sulfonic acid amide derivatives. Two or more different types of these derivatives can be used in combination.

Examples of the thermoplastic resin used to prepare the photo-curable composition include urethane resins, acrylic resins, polyamide resins, polyimide resins, styrene-maleic acid resins, and styrene-maleic anhydride resins.

Examples of the photo-curable compound include bifunctional monomers such as 1,6-hexanediol diacrylate, ethylene glycol diacrylate, neopentyl glycol diacrylate, triethylene glycol diacrylate, bis(acryloxyethoxy) bisphenol A, and 3-methylpentanediol diacrylate; polyfunctional monomers having a relatively low molecular weight, such as trimethylolpropane triacrylate, pentaerythritol triacrylate, tris[2-(meth)acryloyloxyethyl]isocyanurate, dipentaerythritol hexaacrylate, and dipentaerythritol pentaacrylate; and polyfunctional monomers having a relatively high molecular weight, such as polyester acrylates, polyurethane acrylates, and polyether acrylates.

Examples of the photopolymerization initiator include acetophenone, benzophenone, benzyldimethyl ketal, benzoyl peroxide, 2-chlorothioxanthone, 1,3-bis(4'-azidobenzal)-2-propane, 1,3-bis(4'-azidobenzal)-2-propane-2'-sulfonic acid, and 4,4'-diazidostilbene-2,2'-disulfonic acid. Examples of a commercially available photopolymerization initiator include "Irgacure (trademark)-184", "Irgacure (trademark)-369", and "Darocur (trademark)-1173" manufactured by BASF; "Lucirin-TPO" manufactured by BASF; "Kayacure (trademark) DETX" and "Kayacure (trademark) OA" manufactured by Nippon Kayaku Co., Ltd.; "Vicure 10" and "Vicure 55" manufactured by Stauffer; "Trigonal PI" manufactured by Akzo; "Sandoray 1000" manufactured by Sandoz; "DEAP" manufactured by Upjohn Co.; and "Biimidazole" manufactured by Kurogane Kasei Co., Ltd.

A publicly known photosensitizer can also be used together with the photopolymerization initiator. Examples of the photosensitizer include amines, urea compounds, compounds containing a sulfur atom, compounds containing a phosphorus atom, compounds containing a chlorine atom, nitriles, and other compounds containing a nitrogen atom. They can be used alone or in combination of two or more.

The mixing ratio of the photopolymerization initiator added is not particularly limited, but is preferably 0.1% to 30% by mass relative to the compound having a photopolymerizable or photo-curable functional group. If the ratio is less than 0.1%, the sensitivity during photocuring tends to decrease. If the ratio is more than 30%, a crystal of the photopolymerization initiator is precipitated when a pigment dispersion resist coating film is dried and thus the physical properties of the coating film may be degraded.

A photo-curable composition for forming pixel portions of a color filter can be prepared using the materials described above. Specifically, 300 to 1000 parts by mass of the organic solvent and 1 to 100 parts by mass of the dispersant relative to 100 parts by mass of the dye and/or pigment composition for color filters of the present invention are stirred and dispersed so as to be uniformly mixed with each other. Thus, a die/pigment liquid can be prepared. Subsequently, 3 to 20 parts by mass in total of the thermoplastic resin and photo-curable compound relative to 1 part by mass of the pigment composition for color filters of the present invention, 0.05 to 3 parts by mass of the photopolymerization initiator relative to 1 part by mass of the photo-curable compound, and optionally an organic solvent are added to the pigment dispersion liquid and stirred and dispersed so as to be uniformly mixed with each other.

A publicly known organic solvent or aqueous alkali solution can be used as the developer. In particular, in the case where the photo-curable composition contains a thermoplastic resin or a photo-curable compound and at least one of the thermoplastic resin and photo-curable compound has an acid value and exhibits alkali solubility, washing with an aqueous alkali solution is effective for formation of color filter pixel portions.

The method for forming color filter pixel portions by a photolithography method has been described in detail. The color filter pixel portions formed by using the pigment composition for color filters of the present invention may be formed by another method such as an electrodeposition method, a transfer method, a micelle electrolysis method, a PVED (photovoltaic electrodeposition) method, an inkjet method, a reverse printing method, or a heat curing method to produce a color filter.

(Alignment Film)

In the liquid crystal display device of the present invention, when an alignment film for aligning a liquid crystal composition needs to be formed on surfaces of first and second substrates that contact the liquid crystal composition, the alignment film is disposed between a color filter and a liquid crystal layer. However, the thickness of the alignment film is at most 100 nm or less, which does not completely block the interaction between a coloring agent such as a pigment constituting the color filter and a liquid crystal compound constituting the liquid crystal layer.

In a liquid crystal display device that does not use an alignment film, higher interaction occurs between a coloring agent such as a pigment constituting the color filter and a liquid crystal compound constituting the liquid crystal layer.

The alignment film can be composed of a transparent organic material such as polyimide, polyamide, BCB (benzocyclobutene polymer), or polyvinyl alcohol. In particular, the alignment film is preferably a polyimide alignment film formed by imidizing polyamic acid synthesized from a diamine such as an aliphatic or alicyclic diamine, e.g., p-phenylene diamine or 4,4'-diaminodiphenylmethane, an aliphatic or alicyclic tetracarboxylic acid anhydride such as butanetetracarboxylic acid anhydride or 2,3,5-tricarboxycyclopentylacetic acid anhydride, and an aromatic tetracarboxylic acid anhydride such as pyromellitic acid dianhydride. In this case, the alignment is generally provided by rubbing, but the alignment film can be used without providing alignment when used as a vertical alignment film or the like.

The alignment film can be composed of a material containing chalcone, cinnamate, cinnamoyl, or an azo group in a compound, and such a material may be used in combination with a material such as polyimide and polyamide. In this case, rubbing or an optical alignment technique may be used for the alignment film.

In the alignment film, a resin film is generally formed by applying the alignment film material onto a substrate by a method such as a spin coating method. A uniaxially stretching method, a Langmuir-Blodgett method, or the like can also be employed.

(Transparent Electrode)

In the liquid crystal display device of the present invention, the transparent electrode can be composed of a material such as a conductive metal oxide. The metal oxide can be indium oxide ($In_2O_3$), tin oxide ($SnO_2$), zinc oxide (ZnO), indium tin oxide ($In_2O_3$—$SnO_2$), indium zinc oxide ($In_2O_3$—ZnO), niobium-added titanium dioxide ($Ti_{1-x}N_{b_x}O_2$), fluorine-doped tin oxide, graphene nanoribbon, or metal nanowire and is preferably zinc oxide (ZnO), indium tin oxide ($In_2O_3$—$SnO_2$), or indium zinc oxide ($In_2O_3$—ZnO). The transparent conductive film can be patterned by, for example, a photo-etching method or a method that uses a mask.

The liquid crystal display device of the present invention is particularly useful for active matrix driving liquid crystal display devices and can be applied to liquid crystal display devices with a TN mode, an IPS mode, a polymer-stabilized IPS mode, an FFS mode, an OCB mode, a VA mode, or an ECB mode.

By combining a backlight, the liquid crystal display device is used in various applications such as monitors of liquid crystal televisions and personal computers, displays of cellular phones and smart phones, notebook computers, mobile information terminals, and digital signage. Examples of the backlight include a cold-cathode tube backlight, and a pseudo-white backlight with two wavelength peaks and a backlight with three wavelength peaks that use a light-emitting diode composed of an inorganic material or an organic EL element.

EXAMPLES

The present invention will now be further described in detail based on Examples, but the present invention is not limited to Examples. In compositions of Examples and Comparative Examples below, "%" means "% by mass".

In Examples, the measured properties are as follows.

$T_{ni}$: nematic phase-isotropic liquid phase transition temperature (° C.)

Δn: refractive index anisotropy at 25° C.

Δ∈: dielectric anisotropy at 25° C.

η: viscosity (mPa·s) at 20° C.

γ1: rotational viscosity (mPa·s) at 25° C.

VHR: voltage holding ratio (%) at 70° C.
(a value, which is expressed as a percentage, of the ratio of a measured voltage to an initial voltage, the measured voltage being obtained by injecting a liquid crystal composition into a cell having a thickness of 3.5 μm and performing measurement at an application voltage of 5 V, a frame time of 200 ms, and a pulse duration of 64 μs)

ID: ion density ($pC/cm^2$) at 70° C.
(an ion density obtained by injecting a liquid crystal composition into a cell having a thickness of 3.5 μm and performing measurement at an application voltage of 20 V and a frequency of 0.05 Hz using MTR-1 (manufactured by TOYO Corporation))

Image Sticking:

Image sticking of a liquid crystal display element was evaluated as follows. A predetermined fixed pattern was displayed in a display area for 1000 hours, and a uniform image was then displayed on the full screen. The level of a residual image of the fixed pattern was evaluated through visual inspection on the basis of the four-level criteria described below.

A: No residual image was observed.

B: A residual image was slightly observed, but was at an acceptable level.

C: A residual image was observed, and was at an unacceptable level.

D: A residual image was observed, and was at a very poor level.

In Examples, the following abbreviations are used for the description of compounds.

(Ring Structure)

[Chem. 21]

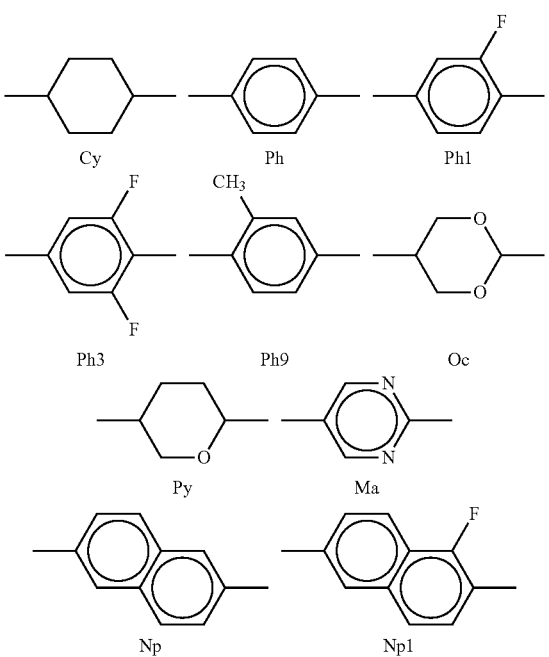

-continued

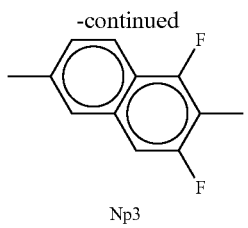

Np3

(Side Chain Structure and Linking Structure)

TABLE 1

| n (number) at terminal | $C_nH_{2n+1}$— |
|---|---|
| -2- | —CH$_2$CH$_2$— |
| -1O- | —CH$_2$O— |
| -O1- | —OCH$_2$— |
| -V- | —CO— |
| -VO- | —COO— |
| -CFFO- | —CF$_2$O— |
| -F | —F |
| -Cl | —Cl |
| -CN | —C≡N |
| -OCFFF | —OCF$_3$ |
| -CFFF | —CF$_3$ |
| -On | —OC$_n$H$_{2n+1}$— |
| -T- | —C≡C— |
| -N- | —CH=N—N=CH— |
| ndm- | $C_nH_{2n+1}$—HC=CH—(CH$_2$)$_{m-1}$— |
| -ndm | —(CH$_2$)$_{n-1}$—HC=CH—$C_mH_{2m+1}$ |
| ndmO- | $C_nH_{2n+1}$—HC=CH—(CH$_2$)$_{m-1}$O— |
| -Ondm | —O—(CH$_2$)$_{n-1}$—HC=CH—$C_mH_{2m+1}$ |
| -ndm- | —(CH$_2$)$_{n-1}$—HC=CH—(CH$_2$)$_{m-1}$— |

[Production of Color Filter]
[Preparation of Colored Composition]
[Red Dye-Colored Composition 1]

Into a plastic bottle, 10 parts of a red dye 1 (C.I. Solvent Red 124), 55 parts of propylene glycol monomethyl ether acetate, and 0.3 to 0.4 mmφ SEPR beads were inserted, and they were dispersed with a paint conditioner (manufactured by Toyo Seiki Seisaku-sho, Ltd.) for four hours and then filtered with a 5-μm filter to obtain a dye-colored liquid. Then, 75.00 parts of the dye-colored liquid, 5.50 parts of polyester acrylate resin (Aronix (trademark) M7100 manufactured by TOAGOSEI CO., LTD.), 5.00 parts of dipentaerythritol hexaacrylate (KAYARAD (trademark) DPHA manufactured by Nippon Kayaku Co., Ltd.), 1.00 part of benzophenone (KAYACURE (trademark) BP-100 manufactured by Nippon Kayaku Co., Ltd.), and 13.5 parts of UCAR Ester EEP were stirred with a mixer and filtered with a filter having a pore size of 1.0 μm to obtain a red dye-colored composition 1.

[Red Dye-Colored Composition 2]

A red dye-colored composition 2 was prepared in the same manner as above, except that 8 parts of the red dye 1 (C.I. Solvent Red 124) and 2 parts of a yellow dye 1 (C.I. Solvent Yellow 21) were used instead of 10 parts of the red dye 1 of the red dye-colored composition 1.

[Red Dye-Colored Composition 3]

A red dye-colored composition 3 was prepared in the same manner as above, except that 10 parts of a red dye 2 (C.I. Solvent Red 1) was used instead of 10 parts of the red dye 1 of the red dye-colored composition 1.

[Green Dye-Colored Composition 1]

A green dye-colored composition 1 was prepared in the same manner as above, except that 10 parts of a green dye 1 (C.I. Solvent Green 7) was used instead of 10 parts of the red dye 1 of the red dye-colored composition 1.

[Blue Dye-Colored Composition 1]

A blue dye-colored composition 1 was prepared in the same manner as above, except that 10 parts of a blue dye 1 (C.I. Solvent Blue 7) was used instead of 10 parts of the red dye 1 of the red dye-colored composition 1.

[Blue Dye-Colored Composition 2]

A blue dye-colored composition 2 was prepared in the same manner as above, except that 7 parts of the blue dye 1 (C.I. Solvent Blue 7) and 3 parts of a purple dye 1 (C.I. Basic Violet 10) were used instead of 10 parts of the blue dye 1 of the blue dye-colored composition 1.

[Blue Dye-Colored Composition 3]

A blue dye-colored composition 3 was prepared in the same manner as above, except that 10 parts of a blue dye 2 (C.I. Solvent Blue 12) was used instead of 7 parts of the blue dye 1 and 3 parts of the purple dye 1 of the blue dye-colored composition 2.

[Yellow Dye-Colored Composition 1]

A yellow dye-colored composition 1 was prepared in the same manner as above, except that 10 parts of a yellow dye 1 (C.I. Solvent Yellow 21) was used instead of 10 parts of the red dye 1 of the red dye-colored composition 1.

[Yellow Dye-Colored Composition 2]

A yellow dye-colored composition 2 was prepared in the same manner as above, except that 10 parts of a yellow dye 4 (C.I. Solvent Yellow 2) was used instead of 10 parts of the yellow dye 1 of the yellow dye-colored composition 1.

[Red Pigment-Colored Composition 1]

Into a plastic bottle, 10 parts of a red pigment 1 (C.I. Pigment Red 254, "IRGAPHOR RED BT-CF" manufactured by BASF), 55 parts of propylene glycol monomethyl ether acetate, 7.0 parts of DISPERBYK LPN21116 (manufactured by BYK-Chemie GmbH), and 0.3 to 0.4 mmφ zirconia beads "ER-120S" manufactured by Saint-Gobain were inserted, and they were dispersed with a paint conditioner (manufactured by Toyo Seiki Seisaku-sho, Ltd.) for four hours and then filtered with a 1-μm filter to obtain a pigment dispersion liquid. Then, 75.00 parts of the pigment dispersion liquid, 5.50 parts of polyester acrylate resin (Aronix (trademark) M7100 manufactured by TOAGOSEI CO., LTD.), 5.00 parts of dipentaerythritol hexaacrylate (KAYARAD (trademark) DPHA manufactured by Nippon Kayaku Co., Ltd.), 1.00 part of benzophenone (KAYACURE (trademark) BP-100 manufactured by Nippon Kayaku Co., Ltd.), and 13.5 parts of UCAR Ester EEP were stirred with a mixer and filtered with a filter having a pore size of 1.0 μm to obtain a red pigment-colored composition 1.

[Red Pigment-Colored Composition 2]

A red pigment-colored composition 2 was prepared in the same manner as above, except that 6 parts of the red pigment 1, 2 parts of a red pigment 2 (C.I. Pigment Red 177, FASTOGEN SUPER RED ATY-TR manufactured by DIC Corporation), and 2 parts of a yellow pigment 2 (C.I. Pigment Yellow 139) were used instead of 10 parts of the red pigment 1 of the red pigment-colored composition 1.

[Green Pigment-Colored Composition 1]

A green pigment-colored composition 1 was prepared in the same manner as above, except that 10 parts of a green pigment 1 (halogenated aluminum phthalocyanine (AlClPcBr14ClH)) was used instead of 10 parts of the red pigment 1 of the red pigment-colored composition 1.

[Green Pigment-Colored Composition 2]

A green pigment-colored composition 2 was prepared in the same manner as above, except that 10 parts of a green pigment 2 (halogenated zinc phthalocyanine (ZnPcBr14ClH)) was used instead of 10 parts of the green pigment 1 of the green pigment-colored composition 1.

[Green Pigment-Colored Composition 3]

A green pigment-colored composition 3 was prepared in the same manner as above, except that 6 parts of a green pigment 3 (C.I. Pigment Green 58, FASTOGEN GREEN A110 manufactured by DIC Corporation) and 4 parts of a yellow pigment 1 (C.I. Pigment Yellow 150, FANCHON FAST YELLOW E4GN manufactured by LANXESS) were used instead of 10 parts of the green pigment 1 of the green pigment-colored composition 1.

[Green Pigment-Colored Composition 4]

A green pigment-colored composition 4 was prepared in the same manner as above, except that 4 parts of a green pigment 4 (C.I. Pigment Green 58, FASTOGEN GREEN A310 manufactured by DIC Corporation) and 6 parts of a yellow pigment 3 (C.I. Pigment YELLOW 138) were used instead of 6 parts of the green pigment 3 and 4 parts of the yellow pigment 1 of the green pigment-colored composition 3.

[Blue Pigment-Colored Composition 1]

A blue pigment-colored composition 1 was prepared in the same manner as above, except that 9 parts of a blue pigment 1 (C.I. Pigment Blue 15:6, "FASTOGEN BLUE EP-210" manufactured by DIC Corporation) and 1 part of a purple pigment 1 (C.I. Pigment Violet 23) were used instead of 10 parts of the red pigment 1 of the red pigment-colored composition 1.

[Blue Pigment/Dye-Colored Composition 2]

A blue pigment/dye-colored composition 2 was prepared in the same manner as above, except that 1 part of a purple dye 1 (C.I. Basic Violet 10) was used instead of 1 part of the purple pigment 1 of the blue pigment-colored composition 1.

[Yellow Pigment-Colored Composition 1]

A yellow pigment-colored composition 1 was prepared in the same manner as above, except that 10 parts of the yellow pigment 1 (C.I. Pigment Yellow 150, FANCHON FAST YELLOW E4GN manufactured by LANXESS) was used instead of 10 parts of the red pigment 1 of the red pigment-colored composition 1.

[Production of Color Filter]

The red colored composition was applied by spin coating onto a glass substrate on which a black matrix was formed in advance, so as to have a thickness of 2 μm. The red colored composition was dried at 70° C. for 20 minutes and then exposed to ultraviolet rays through a photomask in a striped pattern using an exposure device equipped with an ultrahigh-pressure mercury lamp. The exposed product was subjected to spray development with an alkali developer for 90 seconds, washed with ion-exchanged water, and air-dried. Subsequently, the resultant product was post-baked in a clean oven at 230° C. for 30 minutes to form a red pixel, which was a striped colored layer, on the transparent substrate.

Next, the green colored composition was applied by spin coating in the same manner so as to have a thickness of 2 μm. After drying, exposure and development were performed with an exposure device so that a striped colored layer was formed in a place shifted from the place of the red pixel. Thus, a green pixel adjacent to the red pixel was formed.

Next, the blue colored composition was applied by spin coating in the same manner so as to have a thickness of 2 μm to form a blue pixel adjacent to the red pixel and green pixel. Thus, a color filter including red, green, and blue striped pixels was produced on the transparent substrate.

When necessary, the yellow colored composition was applied by spin coating in the same manner so as to have a thickness of 2 μm to form a yellow pixel adjacent to the green pixel and a blue pixel. Thus, a color filter including red, green, blue, and yellow striped pixels was produced on the transparent substrate.

Color filters 1 to 4 and a comparative color filter 1 were produced using dye-colored compositions or pigment-colored compositions listed in Table 2.

TABLE 2

|  | Color filter 1 | Color filter 2 | Color filter 3 | Color filter 4 | Comparative color filter 1 |
| --- | --- | --- | --- | --- | --- |
| R pixel portion | Red dye-colored composition 1 | Red dye-colored composition 2 | Red pigment-colored composition 1 | Red pigment-colored composition 2 | Red dye-colored composition 3 |
| G pixel portion | Green pigment-colored composition 1 | Green pigment-colored composition 2 | Green pigment-colored composition 3 | Green pigment-colored composition 4 | Green dye-colored composition 1 |
| B pixel portion | Blue dye-colored composition 1 | Blue dye-colored composition 2 | Blue pigment-colored composition 1 | Blue pigment/dye-colored composition 2 | Blue dye-colored composition 3 |
| Y pixel portion | None | Yellow dye-colored composition 1 | None | Yellow pigment-colored composition 1 | Yellow dye-colored composition 2 |

In each of the pixel portions of the color filter, the x value and y value in the CIE 1931 XYZ color system with use of a C light source were measured with a microspectrophotometer including a microscope MX-50 manufactured by Olympus Corporation and a spectrophotometer MCPD-3000 manufactured by Otsuka Electronics Co., Ltd. Table below shows the results.

TABLE 3

|  | Color filter 1 (x, y) | Color filter 2 (x, y) | Color filter 3 (x, y) | Color filter 4 (x, y) | Comparative color filter (x, y) |
| --- | --- | --- | --- | --- | --- |
| R pixel portion | (0.63, 0.29) | (0.62, 0.31) | (0.62, 0.32) | (0.63, 0.33) | (0.59, 0.30) |
| G pixel portion | (0.26, 0.64) | (0.22, 0.66) | (0.24, 0.72) | (0.22, 0.70) | (0.20, 0.55) |
| B pixel portion | (0.17, 0.10) | (0.13, 0.14) | (0.14, 0.10) | (0.15, 0.07) | (0.14, 0.15) |
| Y pixel portion |  | (0.47, 0.51) |  | (0.48, 0.50) | (0.49, 0.48) |

Examples 1 to 4

An electrode structure was formed on at least one of first and second substrates, and an alignment film having a horizontal alignment property was formed on each of surfaces of the first and second substrates facing each other.

Then, a weak rubbing treatment was performed, an IPS cell was made, and a liquid crystal composition 1 described below was sandwiched between the first substrate and the second substrate. Table 4 shows the physical properties of the liquid crystal composition 1. Subsequently, liquid crystal display devices of Examples 1 to 4 were produced using the color filters 1 to 4 listed in Table 2 ($d_{gap}$=4.0 μm, alignment film AL-1051). The VHR and ID of the produced liquid crystal display devices were measured. The image sticking of the produced liquid crystal display devices was also evaluated. Table 5 shows the results.

[Chem. 22]

| Chemical structure | Proportion | Abbreviation |
| --- | --- | --- |
| $C_3H_7$—Cy—Cy—CH=CH$_2$ | 48% | 3-Cy-Cy-1d0 |
| $C_3H_7$—Cy—Cy—CH=CH—CH$_3$ | 4% | 3-Cy-Cy-1d1 |
| $H_3C$—Ph—Ph—CH$_2$—CH=CH—CH$_3$ | 8% | 1-Ph-Ph-3d1 |
| $C_3H_7$—Cy—Ph—Ph—$C_2H_5$ | 5% | 3-Cy-Ph-Ph-2 |
| $C_2H_5$—Ph—Ph1(F)—Ph—$C_3H_7$ | 5% | 2-Ph-Ph1-Ph-3 |
| $C_3H_7$—Ph—Ph3(F,F)—CF$_2$O—Ph3(F,F,F)—F | 2% | 3-Ph-Ph3-CFFO-Ph3-F |
| $C_3H_7$—Cy—Cy—CF$_2$O—Ph3(F,F,F)—F | 3% | 3-Cy-Cy-CFFO-Ph3-F |
| $C_3H_7$—Ph—Ph1(F)—Ph3(F,F)—CF$_2$O—Ph3(F,F,F)—F | 7% | 3-Ph-Ph1-Ph3-CFFO-Ph3-F |
| $C_3H_7$—Cy—Cy—Ph3(F,F)—CF$_2$O—Ph3(F,F,F)—F | 5% | 4-Cy-Cy-Ph3-CFFO-Ph3-F |

TABLE 4

| | |
| --- | --- |
| $T_{NI}$/° C. | 75.8 |
| Δn | 0.112 |

TABLE 4-continued

| | |
|---|---|
| no | 1.488 |
| $\epsilon_\perp$ | 5.5 |
| $\Delta\epsilon$ | 2.9 |
| $\eta$/mPa·s | 13.5 |

TABLE 5

| | Example 1 | Example 2 | Example 3 | Example 4 |
|---|---|---|---|---|
| Liquid crystal composition | Liquid crystal composition 1 | Liquid crystal composition 1 | Liquid crystal composition 1 | Liquid crystal composition 1 |
| Color filter | Color filter 1 | Color filter 2 | Color filter 3 | Color filter 4 |
| VHR | 99.3 | 99.5 | 99.8 | 99.7 |
| ID | 49 | 28 | 12 | 15 |
| Image sticking | B | A | A | A |

It was found that the liquid crystal composition 1 had a liquid crystal phase temperature range of 75.8° C., which was practical for use as a liquid crystal composition for TVs, a high absolute value of dielectric anisotropy, low viscosity, and an appropriate value of Δn.

In the liquid crystal display devices of Examples 1 to 4, high VHRs and low IDs were achieved. In the evaluation of image sticking, no residual image was observed or a residual image was slightly observed, which was at an acceptable level.

Examples 5 to 12

Liquid crystal compositions 2 and 3 listed in Table 5 were sandwiched as in Example 1. Liquid crystal display devices of Examples 5 to 12 were produced using the color filters listed in Table 2 and the VHR and ID were measured. The image sticking of the liquid crystal display devices was also evaluated. Tables 7 and 8 show the results.

TABLE 6

| Name of compound | (%) |
|---|---|
| Liquid crystal composition 2 | |
| 4-Cy-Cy-1d0 | 15 |
| 0d1-Cy-Cy-Ph-1 | 4 |
| 0d3-Cy-Cy-Ph-1 | 14 |
| 3-Cy-Ph-Ph-Cy-3 | 3 |
| 3-Cy-Ph-Ph1-Cy-3 | 4 |
| 1-Cy-Cy-Ph3-F | 9 |
| 2-Cy-Ph-Ph3-F | 10 |
| 3-Cy-Ph-Ph3-F | 10 |
| 5-Cy-Ph-Ph3-F | 5 |
| 0d1-Cy-Cy-Ph1-F | 8 |
| 3-Cy-Cy-Ph1-Ph3-F | 8 |
| 2-Ph-Ph3-CFFO-Ph3-F | 4 |
| 3-Ph-Ph3-CFFO-Ph3-F | 6 |
| $T_{ni}$/° C. | 100.7 |
| Δn | 0.094 |
| Δε | 8.0 |
| γ1/mPa·s | 108 |
| η/mPa·s | 22.2 |
| Liquid crystal composition 3 | |
| 5-Cy-Cy-1d0 | 5 |
| 3-Cy-Cy-1d1 | 10 |
| 0d1-Cy-Cy-Ph-1 | 8 |
| 5-Cy-Cy-Ph-O1 | 6 |
| 2-Ph-Ph1-Ph-3 | 8 |
| 2-Cy-Cy-Ph3-F | 11 |
| 3-Cy-Cy-Ph3-F | 15 |
| 5-Cy-Cy-Ph3-F | 5 |

TABLE 6-continued

| Name of compound | (%) |
|---|---|
| 3-Cy-Ph-Ph3-F | 6 |
| 3-Cy-Ph-Ph1-F | 9 |
| 4-Cy-Cy-Ph-OCFFF | 4 |
| 3-Cy-Cy-CFFO-Ph3-F | 7 |
| 5-Cy-Cy-CFFO-Ph3-F | 4 |
| 3-Cy-Cy-Ph1-Ph3-F | 2 |
| $T_{ni}$/° C. | 103.2 |
| Δn | 0.102 |
| Δε | 7.1 |
| γ1/mPa·s | 96 |
| η/mPa·s | 20.8 |

TABLE 7

| | Example 5 | Example 6 | Example 7 | Example 8 |
|---|---|---|---|---|
| Liquid crystal composition | Liquid crystal composition 2 | Liquid crystal composition 2 | Liquid crystal composition 2 | Liquid crystal composition 2 |
| Color filter | Color filter 1 | Color filter 2 | Color filter 3 | Color filter 4 |
| VHR | 99.2 | 99.5 | 99.8 | 99.6 |
| ID | 79 | 32 | 23 | 14 |
| Image sticking | B | A | A | A |

TABLE 8

| | Example 9 | Example 10 | Example 11 | Example 12 |
|---|---|---|---|---|
| Liquid crystal composition | Liquid crystal composition 3 | Liquid crystal composition 3 | Liquid crystal composition 3 | Liquid crystal composition 3 |
| Color filter | Color filter 1 | Color filter 2 | Color filter 3 | Color filter 4 |
| VHR | 99.3 | 99.5 | 99.8 | 99.8 |
| ID | 47 | 38 | 12 | 12 |
| Image sticking | A | A | A | A |

In the liquid crystal display devices of Examples 5 to 12, high VHRs and low IDs were achieved. In the evaluation of image sticking, no residual image was observed or a residual image was slightly observed, which was at an acceptable level.

Examples 13 to 24

Liquid crystal compositions 4 to 6 listed in Table 9 were sandwiched as in Example 1. Liquid crystal display devices of Examples 13 to 24 were produced using the color filters listed in Table 2 and the VHR and ID were measured. The image sticking of the liquid crystal display devices was also evaluated. Tables 10 to 12 show the results.

TABLE 9

| Name of compound | Content (%) |
|---|---|
| Liquid crystal composition 4 | |
| 5-Cy-Cy-1d0 | 15 |
| 3-Cy-Cy-1d1 | 2 |
| 0d1-Cy-Cy-Ph-1 | 12 |
| 2-Ph-Ph1-Ph-3 | 3 |
| 2-Ph-Ph1-Ph-4 | 3 |
| 2-Cy-Cy-Ph3-F | 8 |
| 2-Cy-Ph-Ph3-F | 3 |
| 3-Cy-Ph-Ph3-F | 9 |
| 4-Cy-Cy-Ph-OCFFF | 14 |

TABLE 9-continued

| Name of compound | Content (%) |
|---|---|
| 3-Ph-Ph3-CFFO-Ph3-F | 11 |
| 2-Cy-Cy-CFFO-Ph3-F | 9 |
| 3-Cy-Cy-CFFO-Ph3-F | 8 |
| 3-Cy-Cy-Ph1-Ph3-F | 3 |
| $T_{ni}/°C$ | 90.2 |
| $\Delta n$ | 0.098 |
| $\Delta \epsilon$ | 9.1 |
| $\gamma 1/mPa \cdot s$ | 90 |
| $\eta/mPa \cdot s$ | 18.1 |
| Liquid crystal composition 5 | |
| 5-Cy-Cy-1d0 | 10 |
| 3-Cy-Cy-1d1 | 5 |
| 0d1-Cy-Cy-Ph-1 | 8 |
| 0d3-Cy-Cy-Ph-1 | 12 |
| 2-Ph-Ph1-Ph-5 | 2 |
| 3-Cy-Ph-Ph-Cy-3 | 3 |
| 3-Cy-Ph-Ph1-Cy-3 | 3 |
| 1-Cy-Cy-Ph3-F | 9 |
| 2-Cy-Cy-Ph3-F | 10 |
| 3-Cy-Cy-Ph3-F | 6 |
| 5-Cy-Cy-Ph3-F | 5 |
| 0d1-Cy-Cy-Ph1-F | 8 |
| 2-Ph-Ph3-CFFO-Ph3-F | 4 |
| 3-Ph-Ph3-CFFO-Ph3-F | 6 |
| 3-Cy-Cy-Ph1-Ph3-F | 9 |
| $T_{ni}/°C$ | 110.0 |
| $\Delta n$ | 0.099 |
| $\Delta \epsilon$ | 8.3 |
| $\gamma 1/mPa \cdot s$ | 112 |
| $\eta/mPa \cdot s$ | 23.4 |
| Liquid crystal composition 6 | |
| 5-Cy-Cy-1d0 | 12 |
| 3-Cy-Cy-1d1 | 25 |
| 3-Cy-Cy-1d1 | 12 |
| 0d1-Cy-Cy-Ph-1 | 4 |
| 0d3-Cy-Cy-Ph-1 | 9 |
| 2-Ph-Ph1-Ph3-F | 5 |
| 3-Ph-Ph1-Ph3-F | 9 |
| 2-Ph-Ph3-CFFO-Ph3-F | 4 |
| 3-Ph-Ph3-CFFO-Ph3-F | 6 |
| 3-Cy-Cy-CFFO-Ph3-F | 2 |
| 5-Cy-Cy-CFFO-Ph3-F | 3 |
| 3-Cy-Cy-Ph1-Ph3-F | 9 |
| $T_{ni}/°C$ | 77.4 |
| $\Delta n$ | 0.101 |
| $\Delta \epsilon$ | 7.0 |
| $\gamma 1/mPa \cdot s$ | 86 |
| $\eta/mPa \cdot s$ | 14.2 |

TABLE 10

| | Example 13 | Example 14 | Example 15 | Example 16 |
|---|---|---|---|---|
| Liquid crystal composition | Liquid crystal composition 4 | Liquid crystal composition 4 | Liquid crystal composition 4 | Liquid crystal composition 4 |
| Color filter | Color filter 1 | Color filter 2 | Color filter 3 | Color filter 4 |
| VHR | 99.3 | 99.5 | 99.8 | 99.7 |
| ID | 58 | 44 | 11 | 13 |
| Image sticking | A | A | A | A |

TABLE 11

| | Example 17 | Example 18 | Example 19 | Example 20 |
|---|---|---|---|---|
| Liquid crystal composition | Liquid crystal composition 5 | Liquid crystal composition 5 | Liquid crystal composition 5 | Liquid crystal composition 5 |
| Color filter | Color filter 1 | Color filter 2 | Color filter 3 | Color filter 4 |
| VHR | 99.3 | 99.4 | 99.7 | 99.6 |
| ID | 64 | 49 | 14 | 13 |
| Image sticking | B | A | A | A |

TABLE 12

| | Example 21 | Example 22 | Example 23 | Example 24 |
|---|---|---|---|---|
| Liquid crystal composition | Liquid crystal composition 6 | Liquid crystal composition 6 | Liquid crystal composition 6 | Liquid crystal composition 6 |
| Color filter | Color filter 1 | Color filter 2 | Color filter 3 | Color filter 4 |
| VHR | 99.3 | 99.5 | 99.7 | 99.7 |
| ID | 68 | 40 | 15 | 13 |
| Image sticking | B | A | A | A |

In the liquid crystal display devices of Examples 13 to 24, high VHRs and low IDs were achieved. In the evaluation of image sticking, no residual image was observed or a residual image was slightly observed, which was at an acceptable level.

Examples 25 to 36

An electrode structure was formed on each of first and second substrates, and an alignment film having a horizontal alignment property was formed on each of surfaces of the first and second substrates facing each other. Then, a weak rubbing treatment was performed, a TN cell was made, and liquid crystal compositions 7 to 9 described in Table 13 were sandwiched between the first substrate and the second substrate. Subsequently, liquid crystal display devices of Examples 25 to 36 were produced using the color filters 1 to 4 listed in Table 2 ($d_{gap}$=3.5 μm, alignment film SE-7492). The VHR and ID of the produced liquid crystal display devices were measured. The image sticking of the produced liquid crystal display devices was also evaluated. Tables 14 to 16 show the results.

TABLE 13

| Name of compound | Content (%) |
|---|---|
| Liquid crystal composition 7 | |
| 3-Cy-Cy-1d0 | 38 |
| 3-Cy-Cy-1d1 | 9 |
| 0d1-Cy-Cy-Ph-1 | 16 |
| 0d3-Cy-Cy-Ph-1 | 4 |
| 2-Ph-Ph3-CFFO-Ph3-F | 2 |
| 3-Ph-Ph3-CFFO-Ph3-F | 12 |
| 3-Cy-Cy-CFFO-Ph3-F | 7 |
| 3-Ph-Ph-Ph1-Ph3-F | 1 |
| 3-Ph-Ph1-Ph3-CFFO-Ph3-F | 2 |
| 2-Py-Ph-Ph3-CFFO-Ph3-F | 9 |
| $T_{ni}/°C$ | 76.0 |
| $\Delta n$ | 0.097 |
| $\Delta \epsilon$ | 6.8 |
| $\gamma 1/mPa \cdot s$ | 83 |
| $\eta/mPa \cdot s$ | 14.5 |
| Liquid crystal composition 8 | |
| 3-Cy-Cy-1d0 | 38 |
| 3-Cy-Cy-1d1 | 14 |
| 0d3-Cy-Cy-Ph-1 | 8 |
| 3-Ph-Ph3-CFFO-Ph3-F | 9 |
| 3-Cy-Cy-CFFO-Ph3-F | 15 |
| 3-Ph-Ph1-Ph3-CFFO-Ph3-F | 2 |

TABLE 13-continued

| Name of compound | Content (%) |
|---|---|
| 4-Ph-Ph1-Ph3-CFFO-Ph3-F | 7 |
| 5-Ph-Ph1-Ph3-CFFO-Ph3-F | 7 |
| $T_{ni}/°C$. | 81.8 |
| $\Delta n$ | 0.099 |
| $\Delta \epsilon$ | 8.0 |
| $\gamma 1/mPa \cdot s$ | 83 |
| $\eta/mPa \cdot s$ | 14.6 |
| Liquid crystal composition 9 | |
| 3-Cy-Cy-1d0 | 30 |
| 3-Cy-Cy-1d1 | 17 |
| 0d1-Cy-Cy-Ph-1 | 7 |
| 0d3-Cy-Cy-Ph-1 | 7 |
| 3-Cy-Cy-Ph-2 | 2 |
| 2-Ph-Ph1-Ph-4 | 2 |
| 2-Ph-Ph1-Ph3-F | 8 |
| 3-Ph-Ph1-Ph3-F | 12 |
| 3-Ph-Ph3-Ph3-F | 4 |
| 3-Cy-Cy-Ph1-CFFO-Ph3-F | 11 |
| $T_{ni}/°C$. | 75.0 |
| $\Delta n$ | 0.112 |
| $\Delta \epsilon$ | 8.7 |
| $\gamma 1/mPa \cdot s$ | 87 |
| $\eta/mPa \cdot s$ | 15.2 |

TABLE 14

| | Example 25 | Example 26 | Example 27 | Example 28 |
|---|---|---|---|---|
| Liquid crystal composition | Liquid crystal composition 7 | Liquid crystal composition 7 | Liquid crystal composition 7 | Liquid crystal composition 7 |
| Color filter | Color filter 1 | Color filter 2 | Color filter 3 | Color filter 4 |
| VHR | 99.3 | 99.4 | 99.6 | 99.7 |
| ID | 75 | 42 | 19 | 12 |
| Image sticking | B | A | A | A |

TABLE 15

| | Example 29 | Example 30 | Example 31 | Example 32 |
|---|---|---|---|---|
| Liquid crystal composition | Liquid crystal composition 8 | Liquid crystal composition 8 | Liquid crystal composition 8 | Liquid crystal composition 8 |
| Color filter | Color filter 1 | Color filter 2 | Color filter 3 | Color filter 4 |
| VHR | 99.2 | 99.5 | 99.7 | 99.7 |
| ID | 79 | 60 | 11 | 14 |
| Image sticking | B | A | A | A |

TABLE 16

| | Example 33 | Example 34 | Example 35 | Example 36 |
|---|---|---|---|---|
| Liquid crystal composition | Liquid crystal composition 9 | Liquid crystal composition 9 | Liquid crystal composition 9 | Liquid crystal composition 9 |
| Color filter | Color filter 1 | Color filter 2 | Color filter 3 | Color filter 4 |
| VHR | 99.3 | 99.5 | 99.8 | 99.8 |
| ID | 67 | 34 | 12 | 15 |
| Image sticking | A | A | A | A |

In the liquid crystal display devices of Examples 25 to 36, high VHRs and low IDs were achieved. In the evaluation of image sticking, no residual image was observed or a residual image was slightly observed, which was at an acceptable level.

Examples 37 to 44

An electrode structure was formed on at least one of first and second substrates, and an alignment film having a horizontal alignment property was formed on each of surfaces of the first and second substrates facing each other. Then, a weak rubbing treatment was performed, an FFS cell was made, and liquid crystal compositions 10 and 11 described in Table 17 were sandwiched between the first substrate and the second substrate. Subsequently, liquid crystal display devices of Examples 37 to 44 were produced using the color filters 1 to 4 listed in Table 2 ($d_{gap}$=4.0 μm, alignment film AL-1051). The VHR and ID of the produced liquid crystal display devices were measured. The image sticking of the produced liquid crystal display devices was also evaluated. Tables 18 and 19 show the results.

TABLE 17

| Name of compound | Content (%) |
|---|---|
| Liquid crystal composition 10 | |
| 3-Cy-Cy-1d0 | 39 |
| 3-Cy-Cy-1d1 | 7 |
| 0d1-Cy-Cy-Ph-1 | 11 |
| 2-Ph—Ph1—Ph-3 | 8 |
| 2-Ph—Ph1—Ph-5 | 8 |
| 3-Ph—Ph3—CFFO—Ph3—F | 10 |
| 3-Cy-Cy-Ph—Ph3—F | 6 |
| 4-Ph—Ph1—Ph3—CFFO—Ph3—F | 11 |
| $T_{ni}/°C$. | 76.0 |
| $\Delta n$ | 0.114 |
| $\Delta \epsilon$ | 6.0 |
| $\gamma 1/mPa \cdot s$ | 77 |
| $\eta/mPa \cdot s$ | 13.3 |
| Liquid crystal composition 11 | |
| 3-Cy-Cy-1d0 | 44 |
| 3-Cy-Cy-1d1 | 3 |
| 2-Ph—Ph-3d1 | 13 |
| 3-Cy-Ph—Ph-2 | 7 |
| 2-Ph—Ph1—Ph-3 | 8 |
| 3-Ph—Ph1—Ph-3 | 7 |
| 3-Ph—Ph1—Ph3—CFFO—Ph3—F | 9 |
| 4-Cy-Cy-Ph1—CFFO—Ph3—F | 3 |
| 3-Cy-Ph3—Ph1—OCFFF | 6 |
| $T_{ni}/°C$. | 77.9 |
| $\Delta n$ | 0.131 |
| $\Delta \epsilon$ | 4.6 |
| $\gamma 1/mPa \cdot s$ | 74 |
| $\eta/mPa \cdot s$ | 124 |

TABLE 18

| | Example 37 | Example 38 | Example 39 | Example 40 |
|---|---|---|---|---|
| Liquid crystal composition | Liquid crystal composition 10 | Liquid crystal composition 10 | Liquid crystal composition 10 | Liquid crystal composition 10 |
| Color filter | Color filter 1 | Color filter 2 | Color filter 3 | Color filter 4 |
| VHR | 99.3 | 99.4 | 99.6 | 99.7 |
| ID | 72 | 49 | 22 | 15 |
| Image sticking | B | A | A | A |

TABLE 19

|  | Example 41 | Example 42 | Example 43 | Example 44 |
|---|---|---|---|---|
| Liquid crystal composition | Liquid crystal composition 11 | Liquid crystal composition 11 | Liquid crystal composition 11 | Liquid crystal composition 11 |
| Color filter | Color filter 1 | Color filter 2 | Color filter 3 | Color filter 4 |
| VHR | 99.3 | 99.5 | 99.7 | 99.7 |
| ID | 66 | 52 | 12 | 16 |
| Image sticking | A | A | A | A |

In the liquid crystal display devices of Examples 37 to 44, high VHRs and low IDs were achieved. In the evaluation of image sticking, no residual image was observed or a residual image was slightly observed, which was at an acceptable level.

Examples 45 to 56

Liquid crystal compositions 12 to 14 listed in Table 20 were sandwiched as in Example 37. Liquid crystal display devices of Examples 45 to 56 were produced using the color filters listed in Table 2 and the VHR and ID were measured. The image sticking of the liquid crystal display devices was also evaluated. Tables 21 to 23 show the results.

TABLE 20

| Name of compound | Content (%) |
|---|---|
| Liquid crystal composition 12 | |
| 3-Cy-Cy-1d0 | 47 |
| 3-Cy-Cy-1d1 | 9 |
| 3-Cy-Cy-Ph-2 | 7 |
| 2-Ph—Ph1—Ph-3 | 4 |
| 2-Ph—Ph1—Ph-5 | 7 |
| 3-Cy-Ph—Ph-Cy-3 | 2 |
| 2-Ph—Ph1—Ph-3 | 6 |
| 3-Ph—Ph1—Ph-3 | 7 |
| 3-Ph—Ph3—CFFO—Ph3—F | 2 |
| 3-Cy-Cy-Ph1—Ph3—F | 2 |
| 3-Cy-Ph—Ph3—Ph1—OCFFF | 7 |
| $T_{ni}/°C.$ | 80.6 |
| $\Delta n$ | 0.122 |
| $\Delta\epsilon$ | 6.0 |
| $\gamma 1/mPa \cdot s$ | 65 |
| $\eta/mPa \cdot s$ | 11.1 |
| Liquid crystal composition 13 | |
| 3-Cy-Cy-1d0 | 29 |
| 5-Cy-Cy-1d1 | 8 |
| 3-Cy-Cy-1d1 | 13 |
| 5-Ph—Ph-1 | 2 |
| 2-Ph—Ph1—Ph-3 | 6 |
| 2-Ph—Ph1—Ph-4 | 6 |
| 2-Ph—Ph1—Ph-5 | 6 |
| 3-Cy-Ph—Ph-Cy-3 | 4 |
| 3-Ph—Ph1—Ph3—F | 9 |
| 2-Ph—Ph3—Ph3—F | 7 |
| 3-Ph—Ph3—CFFO—Ph3—F | 4 |
| 3-Cy-Ph—Cl | 3 |
| 3-Cy-Cy-Ph1—Ph3—F | 3 |
| $T_{ni}/°C.$ | 74.9 |
| $\Delta n$ | 0.121 |
| $\Delta\epsilon$ | 4.1 |
| $\gamma 1/mPa \cdot s$ | 60 |
| $\eta/mPa \cdot s$ | 10.8 |
| Liquid crystal composition 14 | |
| 3-Cy-Cy-1d0 | 10 |
| 3-Cy-Cy-1d1 | 6 |
| 3-Cy-Cy-1d1-F | 28 |

TABLE 20-continued

| Name of compound | Content (%) |
|---|---|
| 0d1-Cy-Cy-Ph-1 | 11 |
| 0d3-Cy-Cy-Ph-1 | 10 |
| 2-Ph—Ph1—Ph-3 | 10 |
| 2-Ph—Ph1—Ph-5 | 10 |
| 5-Cy-Ph—Ph1—Ph-2 | 2 |
| 3-Ph—Ph3—CFFO—Ph3—F | 7 |
| 3-Cy-Cy-Ph1—CFFO—Ph3—F | 6 |
| $T_{ni}/°C.$ | 80.0 |
| $\Delta n$ | 0.110 |
| $\Delta\epsilon$ | 5.9 |
| $\gamma 1/mPa \cdot s$ | 68 |
| $\eta/mPa \cdot s$ | 11.6 |

TABLE 21

|  | Example 45 | Example 46 | Example 47 | Example 48 |
|---|---|---|---|---|
| Liquid crystal composition | Liquid crystal composition 12 | Liquid crystal composition 12 | Liquid crystal composition 12 | Liquid crystal composition 12 |
| Color filter | Color filter 1 | Color filter 2 | Color filter 3 | Color filter 4 |
| VHR | 99.3 | 99.5 | 99.8 | 99.7 |
| ID | 61 | 48 | 11 | 19 |
| Image sticking | A | A | A | A |

TABLE 22

|  | Example 49 | Example 50 | Example 51 | Example 52 |
|---|---|---|---|---|
| Liquid crystal composition | Liquid crystal composition 13 | Liquid crystal composition 13 | Liquid crystal composition 13 | Liquid crystal composition 13 |
| Color filter | Color filter 1 | Color filter 2 | Color filter 3 | Color filter 4 |
| VHR | 99.2 | 99.4 | 99.6 | 99.7 |
| ID | 73 | 50 | 24 | 17 |
| Image sticking | B | A | A | A |

TABLE 23

|  | Example 53 | Example 54 | Example 55 | Example 56 |
|---|---|---|---|---|
| Liquid crystal composition | Liquid crystal composition 14 | Liquid crystal composition 14 | Liquid crystal composition 14 | Liquid crystal composition 14 |
| Color filter | Color filter 1 | Color filter 2 | Color filter 3 | Color filter 4 |
| VHR | 99.4 | 99.5 | 99.8 | 99.8 |
| ID | 77 | 56 | 13 | 15 |
| Image sticking | B | A | A | A |

In the liquid crystal display devices of Examples 45 to 56, high VHRs and low IDs were achieved. In the evaluation of image sticking, no residual image was observed or a residual image was slightly observed, which was at an acceptable level.

Examples 57 to 60

A liquid crystal composition 15 was prepared by mixing 0.3% by mass of bismethacrylic acid biphenyl-4,4'-diyl with the liquid crystal composition 10 used in Example 37. The liquid crystal composition 15 was set in the TN cell. A polymerization treatment was performed by performing irradiation with ultraviolet rays (3.0 J/cm$^2$) for 600 seconds while applying a driving voltage between electrodes. Liquid crystal display devices of Examples 57 to 60 were then produced using the color filters 1 to 4 listed in Table 2 and the VHR and ID were measured. The image sticking of the liquid crystal display devices was also evaluated. Table 24 shows the results.

TABLE 24

|  | Example 57 | Example 58 | Example 59 | Example 60 |
|---|---|---|---|---|
| Liquid crystal composition | Liquid crystal composition 15 | Liquid crystal composition 15 | Liquid crystal composition 15 | Liquid crystal composition 15 |
| Color filter | Color filter 1 | Color filter 2 | Color filter 3 | Color filter 4 |
| VHR | 99.4 | 99.5 | 99.7 | 99.7 |
| ID | 62 | 53 | 13 | 15 |
| Image sticking | A | A | A | A |

In the liquid crystal display devices of Examples 57 to 60, high VHRs and low IDs were achieved. In the evaluation of image sticking, no residual image was observed or a residual image was slightly observed, which was at an acceptable level.

Examples 61 to 64

A liquid crystal composition 16 was prepared by mixing 0.3% by mass of bismethacrylic acid biphenyl-4,4'-diyl with the liquid crystal composition 8 used in Example 29. The liquid crystal composition 16 was set in the IPS cell. A polymerization treatment was performed by performing irradiation with ultraviolet rays (3.0 J/cm$^2$) for 600 seconds while applying a driving voltage between electrodes. Liquid crystal display devices of Examples 61 to 64 were then produced using the color filters 1 to 4 listed in Table 2 and the VHR and ID were measured. The image sticking of the liquid crystal display devices was also evaluated. Table 25 shows the results.

TABLE 25

|  | Example 61 | Example 62 | Example 63 | Example 64 |
|---|---|---|---|---|
| Liquid crystal composition | Liquid crystal composition 16 | Liquid crystal composition 16 | Liquid crystal composition 16 | Liquid crystal composition 16 |
| Color filter | Color filter 1 | Color filter 2 | Color filter 3 | Color filter 4 |
| VHR | 99.2 | 99.4 | 99.7 | 99.6 |
| ID | 78 | 48 | 13 | 16 |
| Image sticking | B | A | A | A |

In the liquid crystal display devices of Examples 61 to 64, high VHRs and low IDs were achieved. In the evaluation of image sticking, no residual image was observed or a residual image was slightly observed, which was at an acceptable level.

Examples 65 to 68

A liquid crystal composition 17 was prepared by mixing 0.3% by mass of 3-fluorobiphenyl-4,4'-diyl with the liquid crystal composition 6 used in Example 21. The liquid crystal composition 17 was set in the FFS cell. A polymerization treatment was performed by performing irradiation with ultraviolet rays (3.0 J/cm$^2$) for 600 seconds while applying a driving voltage between electrodes. Liquid crystal display devices of Examples 65 to 68 were then produced using the color filters 1 to 4 listed in Table 2 and the VHR and ID were measured. The image sticking of the liquid crystal display devices was also evaluated. Table 26 shows the results.

TABLE 26

|  | Example 65 | Example 66 | Example 67 | Example 68 |
|---|---|---|---|---|
| Liquid crystal composition | Liquid crystal composition 17 | Liquid crystal composition 17 | Liquid crystal composition 17 | Liquid crystal composition 17 |
| Color filter | Color filter 1 | Color filter 2 | Color filter 3 | Color filter 4 |
| VHR | 99.4 | 99.5 | 99.7 | 99.6 |
| ID | 69 | 42 | 16 | 15 |
| Image sticking | B | A | A | A |

In the liquid crystal display devices of Examples 65 to 68, high VHRs and low IDs were achieved. In the evaluation of image sticking, no residual image was observed or a residual image was slightly observed, which was at an acceptable level.

Comparative Examples 1 to 4

A comparative liquid crystal composition 1 described below was set in the IPS cell used in Example 1. Table 27 shows the physical properties of the comparative liquid crystal composition. Liquid crystal display devices of Comparative Examples 1 to 4 were then produced using the color filters 1 to 4 listed in Table 2 and the VHR and ID were measured. The image sticking of the liquid crystal display devices was also evaluated. Table 28 shows the results.

[Chem. 23]

| Chemical structure | Proportion | Abbreviation |
|---|---|---|
| $C_4H_9$—⟨cyclohexyl⟩—COO—⟨phenyl⟩—$CH_3$ | 27% | 4-Cy-VO-Ph-1 |

-continued

[Chem. 23]

| Chemical structure | Proportion | Abbreviation |
|---|---|---|
| 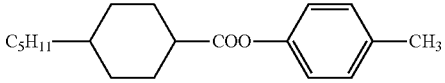 | 20% | 5-Cy-VO-Ph-1 |
| 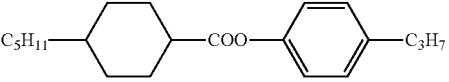 | 20% | 5-Cy-VO-Ph-3 |
| 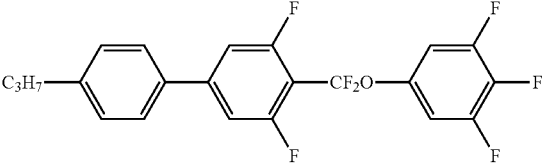 | 8% | 3-Ph-Ph3-CFFO-Ph3-F |
| 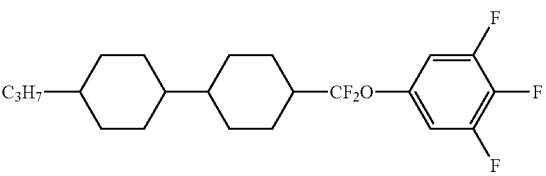 | 13% | 3-Cy-Cy-CFFO-Ph3-F |
| 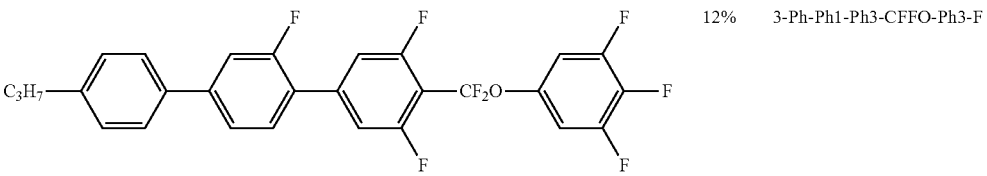 | 12% | 3-Ph-Ph1-Ph3-CFFO-Ph3-F |

TABLE 27

| | |
|---|---|
| $T_{NI}/°C.$ | 69.3 |
| $\Delta n$ | 0.096 |
| no | 1.484 |
| $\epsilon_\perp$ | 5.5 |
| $\Delta\epsilon$ | 4.8 |
| $\eta$/mPa · s | 30.3 |

TABLE 28

| | Comparative Example 1 | Comparative Example 2 | Comparative Example 3 | Comparative Example 4 |
|---|---|---|---|---|
| Liquid crystal composition | Comparative liquid crystal composition 1 | Comparative liquid crystal composition 1 | Comparative liquid crystal composition 1 | Comparative liquid crystal composition 1 |
| Color filter | Color filter 1 | Color filter 2 | Color filter 3 | Color filter 4 |
| VHR | 98.1 | 98.3 | 98.6 | 98.5 |
| ID | 155 | 148 | 135 | 143 |
| Image sticking | D | D | D | D |

In the liquid crystal display devices of Comparative Examples 1 to 4, the VHRs were decreased and the IDs were increased compared with the liquid crystal display devices of the present invention. In the evaluation of image sticking, a residual image was observed, which was at an unacceptable level.

Comparative Examples 5 to 12

Comparative liquid crystal compositions 2 and 3 listed in Table 29 were sandwiched as in Example 1. Liquid crystal display devices of Comparative Examples 5 to 12 were produced using the color filters 1 to 4 listed in Table 2 and the VHR and ID were measured. The image sticking of the liquid crystal display devices was also evaluated. Tables 30 and 31 show the results.

TABLE 29

| Name of compound | Content (%) |
|---|---|
| Comparative liquid crystal composition 2 | |
| 2-Cy-Cy-Ph3—F | 12 |
| 3-Cy-Cy-Ph3—F | 10 |
| 5-Cy-Cy-Ph3—F | 6 |
| 2-Cy-Cy-Ph—OCFFF | 9 |
| 3-Cy-Cy-Ph—OCFFF | 8 |
| 4-Cy-Cy-Ph—OCFFF | 7 |
| 2-Cy-Ph1—Ph3—F | 12 |
| 3-Cy-Ph1—Ph3—F | 10 |
| 2-Cy-Py-Cy-CFFO—Ph3—F | 5.5 |
| 2-Ph—Ph1—Ph3—F | 5.5 |
| 0d1-Cy-Cy-CFFO—Ph3—F | 15 |
| $T_{ni}/°C.$ | 75.7 |
| wj$\Delta$n | 0.093 |
| $\gamma$1/mPa · s | 146 |
| Comparative liquid crystal composition 3 | |
| 2-Cy-Cy-Ph3—F | 12 |
| 3-Cy-Cy-Ph3—F | 10 |
| 2-Cy-Cy-Ph—OCFFF | 8 |

TABLE 29-continued

| Name of compound | Content (%) |
|---|---|
| 3-Cy-Cy-Ph—OCFFF | 8 |
| 4-Cy-Cy-Ph—OCFFF | 7 |
| 5-Cy-Cy-Ph—OCFFF | 4 |
| 2-Cy-Ph1—Ph3—F | 12 |
| 3-Cy-Ph1—Ph3—F | 4 |
| 2-Cy-Cy-CFFO—Ph3—F | 12 |
| 2-Ph—Ph1—Ph3—F | 8 |
| 0d1-Cy-Cy-CFFO—Ph3—F | 15 |
| $T_{ni}/°C$ | 75.0 |
| $\Delta n$ | 0.093 |
| $\gamma 1/mPa \cdot s$ | 139 |

TABLE 30

| | Comparative Example 5 | Comparative Example 6 | Comparative Example 7 | Comparative Example 8 |
|---|---|---|---|---|
| Liquid crystal composition | Comparative liquid crystal composition 2 | Comparative liquid crystal composition 2 | Comparative liquid crystal composition 2 | Comparative liquid crystal composition 2 |
| Color filter | Color filter 1 | Color filter 2 | Color filter 3 | Color filter 4 |
| VHR | 98.2 | 98.2 | 98.4 | 98.3 |
| ID | 151 | 147 | 127 | 140 |
| Image sticking | D | D | C | D |

TABLE 31

| | Comparative Example 9 | Comparative Example 10 | Comparative Example 11 | Comparative Example 12 |
|---|---|---|---|---|
| Liquid crystal composition | Comparative liquid crystal composition 3 | Comparative liquid crystal composition 3 | Comparative liquid crystal composition 3 | Comparative liquid crystal composition 3 |
| Color filter | Color filter 1 | Color filter 2 | Color filter 3 | Color filter 4 |
| VHR | 98.1 | 98.3 | 98.3 | 98.3 |
| ID | 158 | 154 | 114 | 121 |
| Image sticking | D | D | C | D |

In the liquid crystal display devices of Comparative Examples 5 to 12, the VHRs were decreased and the IDs were increased compared with the liquid crystal display devices of the present invention. In the evaluation of image sticking, a residual image was observed, which was at an unacceptable level.

Comparative Examples 13 to 20

Comparative liquid crystal compositions 4 and 5 listed in Table 32 were sandwiched as in Example 1. Liquid crystal display devices of Comparative Examples 13 to 24 were produced using the color filters 1 to 4 listed in Table 2 and the VHR and ID were measured. The image sticking of the liquid crystal display devices was also evaluated. Tables 33 and 34 show the results.

TABLE 32

| Name of compound | Content (%) |
|---|---|
| *Comparative liquid crystal composition 4* | |
| 4-Cy-Cy-1d0 | 15 |
| 0d1-Cy-Cy-Ph-1 | 4 |
| 0d3-Cy-Cy-Ph-1 | 14 |

TABLE 32-continued

| Name of compound | Content (%) |
|---|---|
| 3-Cy-Ph-Ph-Cy-3 | 3 |
| 3-Cy-Ph-Ph1-Cy-3 | 4 |
| 1-Cy-Cy-Ph3-F | 9 |
| 2-Cy-Cy-Ph3-F | 10 |
| 3-Cy-Cy-Ph3-F | 10 |
| 5-Cy-Cy-Ph3-F | 5 |
| 3-Cy-Ph1-Ph3-F | 8 |
| 5-Cy-Ph1-Ph3-F | 7 |
| 3-Ph-Ph1-Ph3-F | 3 |
| 3-Cy-Cy-Ph1-Ph3-F | 8 |
| $T_{ni}/°C$ | 101.0 |
| $\Delta n$ | 0.095 |
| $\Delta \epsilon$ | 8.2 |
| $\gamma 1/mPa \cdot s$ | 115 |
| $\eta/mPa \cdot s$ | 23.6 |
| *Comparative liquid crystal composition 5* | |
| 2-Cy-Cy-1d0 | 32 |
| 0d1-Cy-Cy-Ph-1 | 4 |
| 2-Ph-Ph1-Ph-3 | 10 |
| 2-Ph-Ph1-Ph-5 | 11 |
| 3-Ph-Ph1-Ph-5 | 7 |
| 2-Cy-Cy-Ph-F | 6 |
| 3-Cy-Cy-Ph-F | 21 |
| 5-Cy-Ph-Ph-F | 7 |
| 3-Cy-Ph-Ph3-F | 2 |
| $T_{ni}/°C$ | 77.2 |
| $\Delta n$ | 0.135 |
| $\Delta \epsilon$ | 4.5 |
| $\gamma 1/mPa \cdot s$ | 57 |
| $\eta/mPa \cdot s$ | 10.5 |

TABLE 33

| | Comparative Example 13 | Comparative Example 14 | Comparative Example 15 | Comparative Example 16 |
|---|---|---|---|---|
| Liquid crystal composition | Comparative liquid crystal composition 4 | Comparative liquid crystal composition 4 | Comparative liquid crystal composition 4 | Comparative liquid crystal composition 4 |
| Color filter | Color filter 1 | Color filter 2 | Color filter 3 | Color filter 4 |
| VHR | 98.1 | 98.1 | 98.2 | 98.4 |
| ID | 169 | 136 | 150 | 142 |
| Image sticking | D | D | D | D |

TABLE 34

| | Comparative Example 17 | Comparative Example 18 | Comparative Example 19 | Comparative Example 20 |
|---|---|---|---|---|
| Liquid crystal composition | Comparative liquid crystal composition 5 | Comparative liquid crystal composition 5 | Comparative liquid crystal composition 5 | Comparative liquid crystal composition 5 |
| Color filter | Color filter 1 | Color filter 2 | Color filter 3 | Color filter 4 |
| VHR | 98.1 | 98.1 | 98.3 | 98.4 |
| ID | 184 | 177 | 126 | 130 |
| Image sticking | D | D | C | C |

In the liquid crystal display devices of Comparative Examples 13 to 20, the VHRs were decreased and the IDs were increased compared with the liquid crystal display devices of the present invention. In the evaluation of image sticking, a residual image was observed, which was at an unacceptable level.

Comparative Examples 21 to 32

Comparative liquid crystal compositions 6 to 8 listed in Table 35 were sandwiched as in Example 1. Liquid crystal display devices of Comparative Examples 21 to 32 were produced using the color filters 1 to 4 listed in Table 2 and the VHR and ID were measured. The image sticking of the liquid crystal display devices was also evaluated. Tables 36 to 38 show the results.

TABLE 35

| Name of compound | Content (%) |
|---|---|
| Comparative liquid crystal composition 6 | |
| 4-Cy-Cy-1d0 | 18 |
| 3-Cy-Cy-4 | 15 |
| 0d1-Cy-Cy-Ph-1 | 8 |
| 2-Ph-Ph1-Ph-3 | 10 |
| 2-Ph-Ph1-Ph-5 | 6 |
| 3-Ph-Ph1-Ph-5 | 6 |
| 2-Cy-Cy-Ph-F | 6 |
| 3-Cy-Cy-Ph-F | 10 |
| 5-Cy-Ph-Ph-F | 7 |
| 3-Cy-Ph-Ph3-F | 14 |
| $T_{ni}/°C.$ | 73.5 |
| $\Delta n$ | 0.126 |
| $\Delta \epsilon$ | 4.9 |
| $\gamma 1/mPa \cdot s$ | 94 |
| $\eta/mPa \cdot s$ | 16.9 |
| Comparative liquid crystal composition 7 | |
| 4-Cy-Cy-1d0 | 18 |
| 3-Cy-Cy-4 | 15 |
| 0d1-Cy-Cy-Ph-1 | 8 |
| 2-Ph-Ph1-Ph-3 | 10 |
| 2-Ph-Ph1-Ph-5 | 6 |
| 3-Ph-Ph1-Ph-5 | 5 |
| 2-Cy-Cy-Ph-F | 6 |
| 3-Cy-Cy-Ph-F | 5 |
| 5-Cy-Ph-Ph-F | 7 |
| 3-Cy-Ph-Ph3-F | 15 |
| 3-Cy-Cy-Ph1-Ph3-F | 5 |
| $T_{ni}/°C.$ | 75.7 |
| $\Delta n$ | 0.125 |
| $\Delta \epsilon$ | 5.5 |
| $\gamma 1/mPa \cdot s$ | 103 |
| $\eta/mPa \cdot s$ | 18.4 |
| Comparative liquid crystal composition 8 | |
| 4-Cy-Cy-1d0 | 17 |
| 3-Cy-Cy-4 | 15 |
| 0d3-Cy-Cy-Ph-1 | 8 |
| 3-Cy-Ph-Ph-2 | 10 |
| 2-Ph-Ph1-Ph-5 | 7 |
| 3-Ph-Ph1-Ph-5 | 7 |
| 2-Cy-Cy-Ph-F | 6 |
| 3-Cy-Cy-Ph-F | 5 |
| 5-Cy-Ph-Ph-F | 7 |
| 3-Cy-Ph-Ph3-F | 14 |
| 3-Cy-Cy-Ph1-Ph3-F | 4 |
| $T_{ni}/°C.$ | 85.3 |
| $\Delta n$ | 0.128 |
| $\Delta \epsilon$ | 4.8 |
| $\gamma 1/mPa \cdot s$ | 107 |
| $\eta/mPa \cdot s$ | 19.0 |

TABLE 36

| | Comparative Example 21 | Comparative Example 22 | Comparative Example 23 | Comparative Example 24 |
|---|---|---|---|---|
| Liquid crystal composition | Comparative liquid crystal composition 6 | Comparative liquid crystal composition 6 | Comparative liquid crystal composition 6 | Comparative liquid crystal composition 6 |
| Color filter | Color filter 1 | Color filter 2 | Color filter 3 | Color filter 4 |
| VHR | 98.1 | 98.2 | 98.3 | 98.4 |

TABLE 36-continued

| | Comparative Example 21 | Comparative Example 22 | Comparative Example 23 | Comparative Example 24 |
|---|---|---|---|---|
| ID | 178 | 167 | 143 | 134 |
| Image sticking | D | D | D | C |

TABLE 37

| | Comparative Example 25 | Comparative Example 26 | Comparative Example 27 | Comparative Example 28 |
|---|---|---|---|---|
| Liquid crystal composition | Comparative liquid crystal composition 7 | Comparative liquid crystal composition 7 | Comparative liquid crystal composition 7 | Comparative liquid crystal composition 7 |
| Color filter | Color filter 1 | Color filter 2 | Color filter 3 | Color filter 4 |
| VHR | 98.2 | 98.2 | 98.4 | 98.4 |
| ID | 156 | 150 | 125 | 122 |
| Image sticking | D | D | C | D |

TABLE 38

| | Comparative Example 29 | Comparative Example 30 | Comparative Example 31 | Comparative Example 32 |
|---|---|---|---|---|
| Liquid crystal composition | Comparative liquid crystal composition 8 | Comparative liquid crystal composition 8 | Comparative liquid crystal composition 8 | Comparative liquid crystal composition 8 |
| Color filter | Color filter 1 | Color filter 2 | Color filter 3 | Color filter 4 |
| VHR | 98.1 | 98.1 | 98.3 | 98.4 |
| ID | 177 | 172 | 129 | 119 |
| Image sticking | D | D | D | D |

In the liquid crystal display devices of Comparative Examples 21 to 32, the VHRs were decreased and the IDs were increased compared with the liquid crystal display devices of the present invention. In the evaluation of image sticking, a residual image was observed, which was at an unacceptable level.

Comparative Examples 33 to 44

Comparative liquid crystal compositions 9 to 11 listed in Table 39 were sandwiched as in Example 1. Liquid crystal display devices of Comparative Examples 33 to 44 were produced using the color filters 1 to 4 listed in Table 2 and the VHR and ID were measured. The image sticking of the liquid crystal display devices was also evaluated. Tables 40 to 42 show the results.

TABLE 39

| Name of compound | Content (%) |
|---|---|
| Comparative liquid crystal composition 9 | |
| 2-Cy-Cy-Ph3-F | 10 |
| 0d1-Cy-Cy-Ph1-F | 8 |
| 2-Ph-Ph3-CFFO-Ph3-F | 4 |
| 3-Cy-Cy-Ph3-F | 10 |
| 2-Ph-Ph3-CFFO-Ph3-F | 6 |
| 3-Cy-Cy-Ph1-Ph3-F | 8 |
| 1-Cy-Cy-Ph3-F | 9 |
| 5-Cy-Cy-Ph3-F | 5 |
| 0d3-Ph-T-Ph-3d0 | 15 |
| 3-Cy-Ph-T-Ph-2 | 14 |
| 0d3-Ph-N-Ph-3d0 | 4 |

TABLE 39-continued

| Name of compound | Content (%) |
|---|---|
| 3-Ph-VO-Cy-VO-Ph-3 | 4 |
| 3-Cy-Cy-VO-Ph-Cy-3 | 3 |
| $T_{ni}/°C$ | 101.6 |
| $\Delta n$ | 0.153 |
| $\Delta \epsilon$ | 9.2 |
| $\gamma 1/mPa \cdot s$ | 101 |
| $\eta/mPa \cdot s$ | 23.7 |
| Comparative liquid crystal composition 10 | |
| 2-Cy-Cy-Ph3-F | 10 |
| 0d1-Cy-Cy-Ph1-F | 8 |
| 2-Ph-Ph3-CFFO-Ph3-F | 4 |
| 3-Cy-Cy-Ph3-F | 10 |
| 2-Ph-Ph3-CFFO-Ph3-F | 6 |
| 3-Cy-Cy-Ph1-Ph3-F | 8 |
| 1-Cy-Cy-Ph3-F | 9 |
| 5-Cy-Cy-Ph3-F | 5 |
| 0d3-Ph-T-Ph-3d0 | 10 |
| 3-Cy-Ph3-T-Ph9-1 | 4 |
| 4-Ph-T-Ph-O2 | 4 |
| 3-Cy-Ph-T-Ph-2 | 7 |
| 5-Cy-VO-Ph-1 | 5 |
| 3-Ph-VO-Cy-VO-Ph-3 | 7 |
| 3-Cy-Cy-VO-Ph-Cy-3 | 3 |
| $T_{ni}/°C$ | 96.4 |
| $\Delta n$ | 0.137 |
| $\Delta \epsilon$ | 8.8 |
| $\gamma 1/mPa \cdot s$ | 90 |
| $\eta/mPa \cdot s$ | 25.9 |
| Comparative liquid crystal composition 11 | |
| 2-Cy-Cy-Ph3-F | 10 |
| 0d1-Cy-Cy-Ph1-F | 8 |
| 3-Cy-Cy-Ph3-F | 10 |
| 2-Ph-Ph3-CFFO-Ph3-F | 6 |
| 3-Cy-Cy-Ph1-Ph3-F | 8 |
| 5-Cy-Cy-Ph3-F | 5 |
| 0d3-Ph-T-Ph-3d0 | 10 |
| 3-Cy-Ph3-T-Ph9-1 | 4 |
| 3-Cy-Cy-CFFO-Ph3-F | 4 |
| 4-Ph-T-Ph-O2 | 4 |
| 5-Cy-Cy-CFFO-Ph3-F | 9 |
| 5-Cy-VO-Ph-1 | 5 |
| 0d3-Ph-N-Ph-3d0 | 7 |
| 3-Ph-VO-Cy-VO-Ph-3 | 7 |
| 3-Cy-Cy-VO-Ph-Cy-3 | 3 |
| $T_{ni}/°C$ | 99.2 |
| $\Delta n$ | 0.136 |
| $\Delta \epsilon$ | 7.8 |
| $\gamma 1/mPa \cdot s$ | 105 |
| $\eta/mPa \cdot s$ | 26.6 |

TABLE 40

| | Comparative Example 33 | Comparative Example 34 | Comparative Example 35 | Comparative Example 36 |
|---|---|---|---|---|
| Liquid crystal composition | Comparative liquid crystal composition 9 | Comparative liquid crystal composition 9 | Comparative liquid crystal composition 9 | Comparative liquid crystal composition 9 |
| Color filter | Color filter 1 | Color filter 2 | Color filter 3 | Color filter 4 |
| VHR | 98.1 | 98.3 | 98.5 | 98.4 |
| ID | 162 | 139 | 123 | 134 |
| Image sticking | D | D | D | D |

TABLE 41

| | Comparative Example 37 | Comparative Example 38 | Comparative Example 39 | Comparative Example 40 |
|---|---|---|---|---|
| Liquid crystal composition | Comparative liquid crystal composition 10 | Comparative liquid crystal composition 10 | Comparative liquid crystal composition 10 | Comparative liquid crystal composition 10 |
| Color filter | Color filter 1 | Color filter 2 | Color filter 3 | Color filter 4 |
| VHR | 98.2 | 98.3 | 98.5 | 98.5 |
| ID | 153 | 138 | 129 | 116 |
| Image sticking | D | D | C | C |

TABLE 42

| | Comparative Example 41 | Comparative Example 42 | Comparative Example 43 | Comparative Example 44 |
|---|---|---|---|---|
| Liquid crystal composition | Comparative liquid crystal composition 11 | Comparative liquid crystal composition 11 | Comparative liquid crystal composition 11 | Comparative liquid crystal composition 11 |
| Color filter | Color filter 1 | Color filter 2 | Color filter 3 | Color filter 4 |
| VHR | 98.3 | 98.3 | 98.4 | 98.4 |
| ID | 152 | 144 | 118 | 131 |
| Image sticking | D | D | D | D |

In the liquid crystal display devices of Comparative Examples 33 to 44, the VHRs were decreased and the IDs were increased compared with the liquid crystal display devices of the present invention. In the evaluation of image sticking, a residual image was observed, which was at an unacceptable level.

Comparative Examples 45 to 52

Liquid crystal display devices of Comparative Examples 45 to 52 were produced in the same manner, except that the comparative color filter 1 listed in Table 2 was used instead of the color filter 1 in Examples 5, 13, 17, 25, 37, 45, 61, and 65. The VHR and ID were measured. The image sticking of the liquid crystal display devices was also evaluated. Tables 43 to 44 show the results.

TABLE 43

| | Comparative Example 45 | Comparative Example 46 | Comparative Example 47 | Comparative Example 48 |
|---|---|---|---|---|
| Liquid crystal composition | Liquid crystal composition 2 | Liquid crystal composition 4 | Liquid crystal composition 5 | Liquid crystal composition 7 |
| Color filter | Comparative color filter 1 | Comparative color filter 1 | Comparative color filter 1 | Comparative color filter 1 |
| VHR | 97.9 | 98.0 | 98.3 | 98.3 |
| ID | 206 | 202 | 175 | 164 |
| Image sticking | D | D | D | D |

TABLE 44

| | Comparative Example 49 | Comparative Example 50 | Comparative Example 51 | Comparative Example 52 |
|---|---|---|---|---|
| Liquid crystal composition | Liquid crystal composition 10 | Liquid crystal composition 12 | Liquid crystal composition 16 | Liquid crystal composition 17 |
| Color filter | Comparative color filter 1 | Comparative color filter 1 | Comparative color filter 1 | Comparative color filter 1 |
| VHR | 97.8 | 98.0 | 98.4 | 98.3 |

TABLE 44-continued

|  | Comparative Example 49 | Comparative Example 50 | Comparative Example 51 | Comparative Example 52 |
|---|---|---|---|---|
| ID | 211 | 193 | 158 | 167 |
| Image sticking | D | D | D | D |

In the liquid crystal display devices of Comparative Examples 45 to 52, the VHRs were decreased and the IDs were increased compared with the liquid crystal display devices of the present invention. In the evaluation of image sticking, a residual image was observed, which was at an unacceptable level.

The invention claimed is:

1. A liquid crystal display device comprising a first substrate, a second substrate, a liquid crystal composition layer sandwiched between the first substrate and the second substrate, a color filter constituted by a black matrix and at least RGB three color pixel portions, a pixel electrode, and a common electrode,
wherein the liquid crystal composition layer contains a liquid crystal composition containing at least one compound represented by general formula (I),

[Chem. 1]

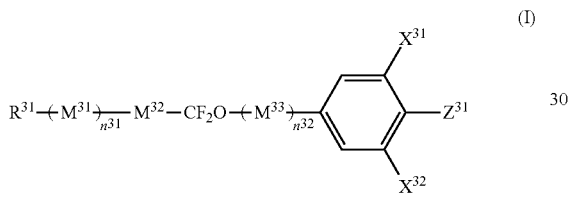

(in general formula, $R^{31}$ represents an alkyl group or alkoxy group having 1 to 10 carbon atoms or an alkenyl group or alkenyloxy group having 2 to 10 carbon atoms, $M^{31}$ to $M^{33}$ each independently represent a trans-1,4-cyclohexylene group or a 1,4-phenylene group, one or two —$CH_2$— in the trans-1,4-cyclohexylene group may be substituted with —O— unless oxygen atoms directly bond to each other, one or two hydrogen atoms in the phenylene group may be substituted with a fluorine atom, $X^{31}$ and $X^{32}$ each independently represent a hydrogen atom or a fluorine atom, $Z^{31}$ represents a fluorine atom, a trifluoromethoxy group, or a trifluoromethyl group, $n^{31}$ and $n^{32}$ each independently represent 0, 1, or 2, $n^{31}+n^{32}$ represents 0, 1, or 2, and when a plurality of $M^{31}$ or $M^{33}$ are present, the plurality of $M^{31}$ may be the same or different or the plurality of $M^{33}$ may be the same or different), and at least one compound selected from the group consisting of compounds represented by general formula (II-a) to general formula (II-e),

[Chem. 2]

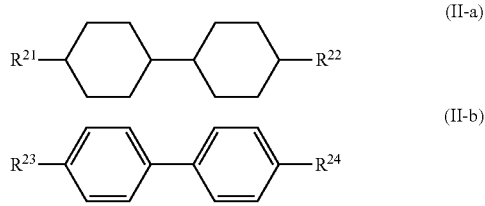

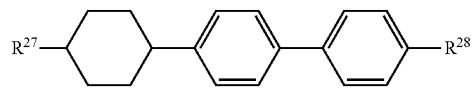

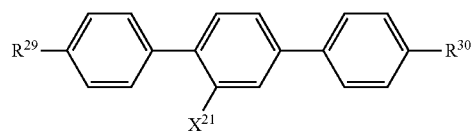

(in general formulae, $R^{21}$ to $R^{30}$ each independently represent an alkyl group having 1 to 10 carbon atoms or an alkenyl group having 2 to 10 carbon atoms, and $X^{21}$ represents a hydrogen atom or a fluorine atom);
the RGB three color pixel portions contain, in a G pixel portion as a coloring material, a halogenated metal phthalocyanine pigment having a central metal selected from the group consisting of Al, Si, Sc, Ti, V, Mg, Fe, Co, Ni, Zn, Ga, Ge, Y, Zr, Nb, In, Sn, and Pb; when the central metal is a trivalent metal, any one of a halogen atom, a hydroxyl group, and a sulfonic acid group bonds to the central metal or the central metal forms an oxo-bridge or thio-bridge; and, when the central metal is a tetravalent metal, a single oxygen atom or any two of a halogen atom, a hydroxyl group, and a sulfonic acid group which may be the same or different bond to the central metal.

2. The liquid crystal display device according to claim 1, wherein the RGB three color pixel portions contain, as coloring materials, a diketopyrrolopyrrole pigment and/or an anionic red organic dye in an R pixel portion and an ∈-type copper phthalocyanine pigment and/or a cationic blue organic dye in a B pixel portion.

3. The liquid crystal display device according to claim 1, wherein the RGB three color pixel portions contain, as coloring materials, C.I. Solvent Red 124 in an R pixel portion and C.I. Solvent Blue 7 in a B pixel portion.

4. The liquid crystal display device according to claim 1, wherein the RGB three color pixel portions contain, as coloring materials, C.I. Pigment Red 254 in an R pixel portion and C.I. Pigment Blue 15:6 in a B pixel portion.

5. The liquid crystal display device according to claim 1, wherein the G pixel portion contains a halogenated zinc phthalocyanine pigment which includes Zn as the central metal and in which 8 to 16 halogen atoms per molecule of phthalocyanine bond to benzene rings of a phthalocyanine molecule.

6. The liquid crystal display device according to claim 1, wherein the G pixel portion contains C.I. Pigment Green 58.

7. The liquid crystal display device according to claim 1, wherein the G pixel portion further contains at least one organic dye/pigment selected from the group consisting of C.I. Pigment Yellow 150, 215, 185, and 138 and C.I. Solvent Yellow 21, 82, 83:1, and 33.

8. The liquid crystal display device according to claim 1, wherein the color filter is constituted by the black matrix, the RGB three color pixel portions, and a Y pixel portion, and the Y pixel portion contains, as a coloring material, at least one yellow organic dye/pigment selected from the group consisting of C.I. Pigment Yellow 150, 215, 185, 138, and 139 and C.I. Solvent Yellow 21, 82, 83:1, 33, and 162.

9. The liquid crystal display device according to claim 1, wherein the compound represented by general formula (I) includes compounds represented by general formula (I-a) to general formula (I-f),

[Chem. 3]

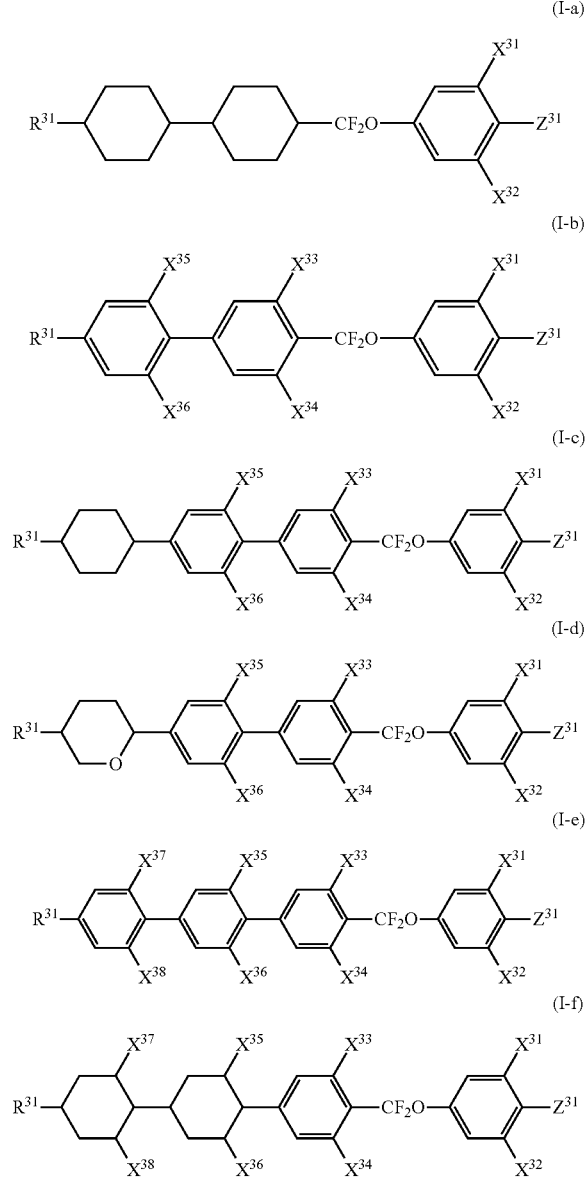

(in general formulae, $R^{31}$ represents an alkyl group or alkoxy group having 1 to 10 carbon atoms or an alkenyl group or alkenyloxy group having 2 to 10 carbon atoms, $X^{31}$ to $X^{38}$ each independently represent a hydrogen atom or a fluorine atom, and $Z^{31}$ represents a fluorine atom, a trifluoromethoxy group, or a trifluoromethyl group).

10. The liquid crystal display device according to claim 1, wherein the liquid crystal composition layer further contains at least one compound selected from the group consisting of compounds represented by general formula (III-a) to general formula (III-f),

[Chem. 4]

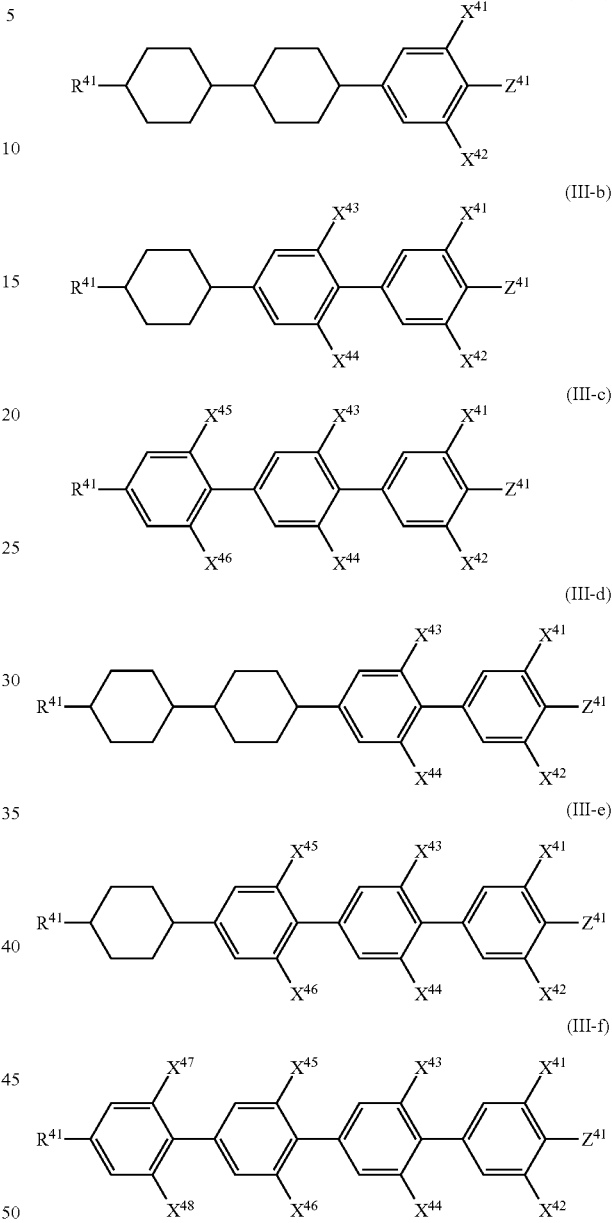

(in general formulae, $R^{41}$ represents an alkyl group or alkoxy group having 1 to 10 carbon atoms or an alkenyl group or alkenyloxy group having 2 to 10 carbon atoms, $X^{41}$ to $X^{48}$ each independently represent a hydrogen atom or a fluorine atom, and $Z^{41}$ represents a fluorine atom, a trifluoromethoxy group, or a trifluoromethyl group).

11. The liquid crystal display device according to claim 1, wherein the liquid crystal composition layer contains a polymer obtained by polymerizing a liquid crystal composition containing at least one polymerizable compound.

12. The liquid crystal display device according to claim 1, wherein the liquid crystal composition layer contains a bifunctional monomer represented by general formula (V),

[Chem. 5]

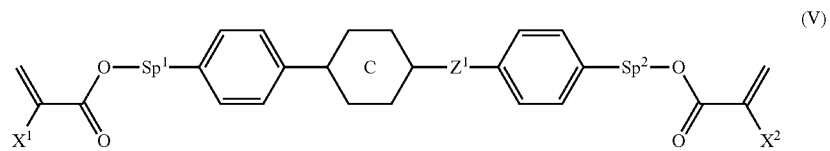

(V)

(in general formula, $X^1$ and $X^2$ each independently represent a hydrogen atom or a methyl group; $Sp^1$ and $Sp^2$ each independently represent a single bond, an alkylene group having 1 to 8 carbon atoms, or —O—$(CH_2)_s$— (where s represents an integer of 2 to 7 and the oxygen atom bonds to an aromatic ring); $Z^1$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently represent a fluorine atom or a hydrogen atom), —C≡C—, or a single bond; and C represents a 1,4-phenylene group, a trans-1,4-cyclohexylene group, or a single bond and, in all the 1,4-phenylene groups in general formula, any of hydrogen atoms may be substituted with fluorine atoms).

* * * * *